United States Patent
Frank

(10) Patent No.: US 7,020,175 B2
(45) Date of Patent: Mar. 28, 2006

(54) MMSE RECEPTION OF DS-CDMA WITH TRANSMIT DIVERSITY

(75) Inventor: Colin D. Frank, Chicago, IL (US)

(73) Assignee: Motorola, Inc., Schaumburg, IL (US)

( * ) Notice: Subject to any disclaimer, the term of this patent is extended or adjusted under 35 U.S.C. 154(b) by 878 days.

(21) Appl. No.: 09/767,050

(22) Filed: Jan. 22, 2001

(65) Prior Publication Data

US 2002/0136158 A1 Sep. 26, 2002

Related U.S. Application Data

(60) Provisional application No. 60/234,400, filed on Sep. 21, 2000.

(51) Int. Cl.
- H04B 1/69 (2006.01)
- H04J 11/00 (2006.01)
- H04L 12/26 (2006.01)

(52) U.S. Cl. .................... 375/130; 370/209; 370/242
(58) Field of Classification Search ................ 375/130, 375/148–267; 370/209–242
See application file for complete search history.

(56) References Cited

U.S. PATENT DOCUMENTS

| | | | | |
|---|---|---|---|---|
| 5,455,844 A | * | 10/1995 | Ishikawa et al. | 375/232 |
| 5,479,448 A | * | 12/1995 | Seshadri | 375/267 |
| 6,175,588 B1 | * | 1/2001 | Visotsky et al. | 375/148 |
| 6,661,856 B1 | * | 12/2003 | Calderbank et al. | 375/347 |
| 6,678,310 B1 | * | 1/2004 | Andren et al. | 375/147 |

FOREIGN PATENT DOCUMENTS

WO   WO 99/18682 A2   4/1999

OTHER PUBLICATIONS

Huang, Howard, I, Chih–Lin "Improving Receiver Performance for Pilot–Aided Frequency Selective CDMA Channels Using a MMSE Switch Mechanism and Multipath Noise Canceller" IEEE 1997.

* cited by examiner

Primary Examiner—Stephen Chin
Assistant Examiner—Cicely Ware
(74) Attorney, Agent, or Firm—Lalita W. Pace; Kenneth A. Haas

(57) ABSTRACT

A pilot signal enters a first MMSE receiver (201) and a second signal enters a second MMSE receiver (202). The first MMSE receiver (201) performs a channel estimate for the received pilot signal, determines a mean-square error of the pilot signal, and operates to minimize the mean-square error of the pilot estimate by constantly updating a weighting vector. An estimate of the pilot channel exits the first MMSE receiver (201). The MMSE weighting vector (206) is also fed into the second MMSE receiver (202) and is applied to the second channel. Symbol estimates (or in other embodiments, chip estimates) exit the second MMSE receiver (202) and enter channel circuitry (204), where normal channel processing occurs.

15 Claims, 8 Drawing Sheets

MMSE RECEPTION OF DS-CDMA WITH TRANSMIT DIVERSITY

REFERENCE(S) TO RELATED APPLICATION(S)

The present application claims priority from provisional application, Ser. No. 60/234,400, entitled "MMSE RECEPTION OF DS-CDMA WITH TRANSMIT DIVERSITY," filed Sep. 21, 2000, which is commonly owned and incorporated herein by reference in its entirety.

FIELD OF THE INVENTION

The present invention relates generally to Code-Division, Multiple-Access (CDMA) receivers, and in particular, to a method and apparatus for receiving a Direct-Sequence (DS) CDMA signal.

BACKGROUND OF THE INVENTION

Transmit diversity is beneficial because it mitigates degradation of the forward link due to signal fading. In its simplest sense, transmit diversity can be thought of as the transmitting a signal to a receiver using multiple antennas. In general diversity can be implemented at either the transmitter, the receiver or at both the transmitter and receiver. Additionally, diversity methods can be combined with feedback from the subscriber to the transmitter. Diversity methods with feedback are referred to as closed-loop methods, while diversity methods without feedback are referred to as open-loop methods. Open-loop transmit diversity methods are desirable because these methods have the least impact on subscriber complexity.

The three open-loop transmit diversity methods that have been included in the third generation standards are orthogonal transmit diversity (OTD), space-time spreading (STS), and space-time transmit diversity (STTD). The first two methods, OTD and STS, have been included in the current release of the third generation partnership project interim standard 2000 (IS20003GPP2 standard), while STTD is part of the third generation partnership project for wideband CDMA (3GPP standard).

Current methods for receiving CDMA signals involve the use of a matched-filter receiver, sometimes referred to as a RAKE receiver. More recently, however, it has been proposed to utilize a Minimum Mean Square Error (MMSE) receiver for reception of CDMA signals. MMSE receivers operate to minimize the mean-square error of the symbol estimates. A detailed description of the operation of such receivers for non-transmit diversity applications is given in the paper "Adaptive Interference Suppression for Direct-Sequence CDMA Systems with Long Spreading Codes" (Colin D. Frank and Eugene Visotsky, In Proceedings of the Allerton Conference on Communications, Control and Computing, Monticello, Ill., Sep. 23–25, 1998, pp. 411–420) Although MMSE receivers have been described for receiving CDMA signals in a non-transmit diversity environment, there currently exists no MMSE receiver capable of receiving CDMA signals with transmit diversity. Therefore, a need exists for an MMSE receiver capable of receiving DS-CDMA signals transmitted utilizing transmit diversity.

DETAILED DESCRIPTION OF THE DRAWINGS

Figure 1:
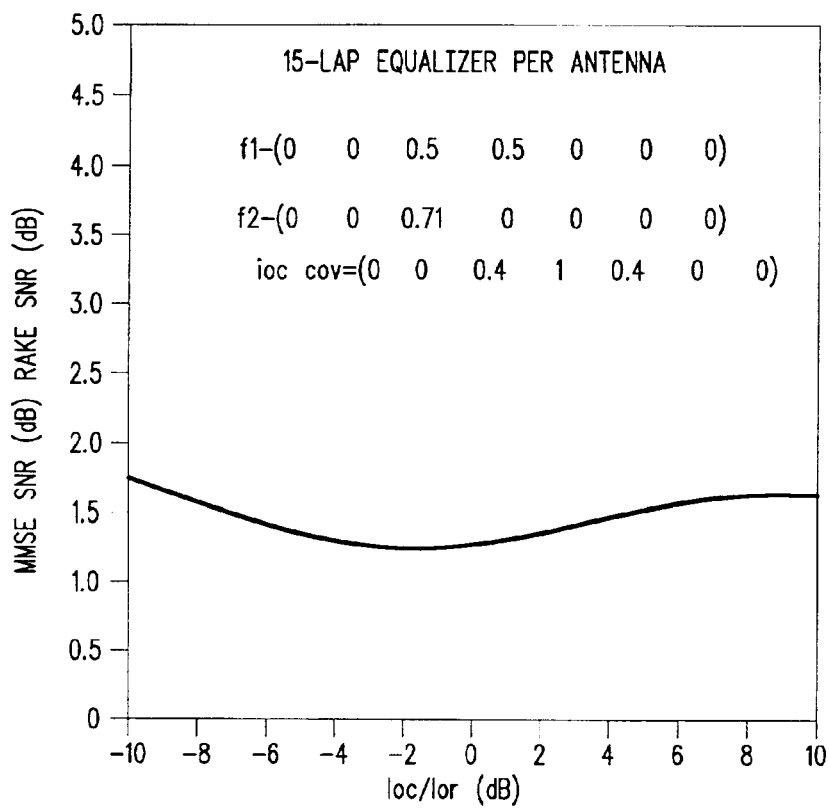
FIG. 1 illustrates the relative performance of an MMSE and Matched Filter receivers for STTD.

To address the need for an MMSE receiver capable of receiving DS-CDMA signals with transmit diversity, several MMSE receivers are provided herein. In particular, three different MMSE receivers—one for OTD, one for STS, and one for STTD are provided.

In an alternate embodiment of the present invention, a pilot-based adaptation is utilized for the MSME receivers. In particular, a pilot signal enters a first MMSE receiver and a second signal enters a second MMSE receiver. The first MMSE receiver performs a channel estimate for the received pilot signal, determines a mean-square error of the pilot signal, and operates to minimize the mean-square error of the pilot estimate by constantly updating a weighting vector. An estimate of the pilot channel exits the first MMSE receiver. The MMSE weighting vector is also fed into the second MMSE receiver and is applied to the second channel. Symbol estimates (or in other embodiments, chip estimates) exit the second MMSE receiver and enter channel circuitry, where normal channel processing occurs.

Since the pilot channel data is known, the MMSE receiver for the pilot channel data can be updated using the measured error of the pilot estimate. However, because the MMSE receiver is the same for both the pilot and other channels, the MMSE receiver for the pilot can be used to demodulate the second channel, and this receiver will yield minimum mean-square error estimates of the data channel symbols.

The present invention encompasses an apparatus comprising a first Minimum Mean Square Error (MMSE) receiver having a signal as an input, wherein the signal was transmitted utilizing a transmit-diversity scheme, and a second MMSE receiver having the signal as an input.

The present invention additionally encompasses a method for Minimum Mean Square Error (MMSE) reception of a signal. The method comprises the steps of receiving a pilot signal at an MMSE receiver, performing a channel estimate for the received pilot signal, and determining a mean-square error of the pilot signal estimate. A weighting vector is updated for the pilot signal estimate in order to minimize the mean square error of the pilot signal estimate and the weighting vector is applied to a second channel.

The present invention additionally encompasses a minimum mean square error receiver (MMSE) comprising a pilot channel input, a second channel input, an output comprising an estimate of the pilot channel, wherein the estimate of the pilot channel is determined by applying a weighting vector to the pilot channel, and a second output comprising an estimate of the second channel, wherein the estimate of the second channel is determined by applying the weighting vector to the second channel.

To address the need for an MMSE receiver capable of receiving DS-CDMA signals with transmit diversity, a MMSE receiver is described herein. In the following discussion, matched filter and MMSE receivers are developed for all three transmit diversity methods. Signal-to-noise ratio expressions for both the matched filter and the MMSE receivers are also developed, and these expressions are used to compare the performance of the different diversity methods. Adaptive implementations of the MMSE receiver for all three forms of transmit diversity are then discussed.

Matched Filter and MMSE Receivers for Orthogonal Transmit Diversity (OTD)

In two-antenna orthogonal transmit diversity, the coded and interleaved symbols are partitioned into pairs of symbols. Let $s_0$ and $s_1$ denote the two symbols in each pair. Several variations of OTD exist. While all forms of OTD can be analyzed using the methods similar to those described herein, we restrict our attention in this discussion to the following particular implementation of OTD. Let w denote the Walsh code assigned to the subscriber of interest, and let N denote the length of this code. For this implementation of OTD, symbols of type $s_0$ are transmitted over the first antenna using the extended code $w^0=(w,-w)$, and the symbols of type $s_1$ are transmitted over the second antenna using the extended code $w^1=(w,w)$. Note that these extended codes are orthogonal to each other and to the set of Walsh codes. Note also that the bandwidth occupied by the subscriber using OTD, measured in terms of the number of Walsh codes allocated to this subscriber, is no greater than for the subscriber not using transmit diversity. Finally, note that the symbol rate of this implementation of OTD is equal to the symbol rate without transmit diversity.

Let K denote the number of subscribers in the sector, and let $P_i$ denote the total power allocated to the i-th subscriber. Let $\alpha_i$ denote the fraction of the power allocated to each of the two antennas for the i-th subscriber. For subscribers employing orthogonal transmit diversity, $\alpha_i$ is equal to ½, while $\alpha_i$ is equal to 0 or 1 for subscribers not employing transmit diversity.

The signal received by the subscriber is filtered and converted to baseband prior to sampling. If the received signal is sampled at the chip rate with sampling times $\{nT_c+\tau\}$, n integer, the performance of the receiver will typically be sensitive to the sampling phase $\tau$. In order to avoid poor performance associated with a particular sampling phase $\tau_0$, the received signal is typically sampled at a multiple of the chip rate. Since the need for oversampling is well understood, this issue will not be addressed further in this paper. Thus, the signal received at the subscriber is filtered, converted to baseband, and sampled at the chip rate to produce the sequence $\{r_k\}$, and the demodulator has access only to this chip-spaced sequence $\{r_k\}$.

Let the vectors $f_0$ and $f_1$, respectively, denote the channels between the first and second antennas and the subscriber of interest. Since the received signal is sampled at the chip rate, the vector elements consist of chip-spaced samples of the channel impulse responses. In order to simplify the analysis, the channels $f_0$ and $f_1$ are assumed to be zero outside of an interval of length M, so that $$f_{i,j}=0 \text{ if } j<0 \text{ or } j>M-1.$$

The sequence $\{r_k\}$ is reduced to a set of observation vectors, $R_0$ and $R_1$, by despreading this sequence with the complex spreading code, $\{c_k\}$ of the serving base station, and correlating with the code channel of interest. Let the vectors $R_0$ and $R_1$ be defined as $$R_{0,l} = \sum_{i=1}^{2N} r_{i+l} c_i^* w_i^0 = \sum_{i=1}^{N} r_{i+l} c_i^* w_i - \sum_{i=1}^{N} r_{N+i+l} c_{N+i}^* w_i$$

$$R_{1,l} = \sum_{i=1}^{2N} r_{i+l} c_i^* w_i^1 = \sum_{i=1}^{N} r_{i+l} c_i^* w_i + \sum_{i=1}^{N} r_{N+i+l} c_{N+i}^* w_i,$$

for l in the interval [0, M−1], so that these vectors are of length M. More generally, the vectors $R_0$ and $R_1$ may be defined on a set of delays which are possibly non-consecutive and may also lie outside the interval [0, M−1]. This more general definition can be used to evaluate the performance of a Rake architecture with MMSE combining or to determine the performance of the MMSE receiver as a function of the equalizer length. However, for the remainder of the discussion in this paper, the initial definition will be used.

The objective is to define and evaluate the performance of the matched filter receiver and the MMSE receiver for the symbols $s_0$ and $s_1$. Both the matched filter receiver and the MMSE receiver yield estimates of the symbols $s_0$ and $s_1$, respectively, of the form $$\hat{s}_0 = v_0^H R_0 \hat{s}_1 = v_1^H R_1.$$

However, before the matched filter and MMSE receivers can be presented, the mean and covariance of the observation vectors $R_0$ and $R_1$ must be evaluated. If the Walsh code w corresponds to the first code channel, then the mean vectors are given by $$\mu_{R_0}(s_0) = E(R_0 s^*_0) = 2N\sqrt{P_1/2} f_0$$

$$\mu_{R_1}(s_1) = E(R_1 s^*_1) = 2N\sqrt{P_1/2} f_1.$$

The correlation matrix of the vector $R_0$ is given by $$\Gamma_{R_0} = E(R_0 R_0^H) =$$
$$2N\left(\sum_{j=0}^{K-1} P_i \alpha_i\right) \Psi^{0,0} + 2N\left(\sum_{j=0}^{K-1} P_i(1-\alpha_i)\right) \Psi^{1,1} + 2N^2 P_1 f_0 f_0^H + 2N I_{oc} \Phi,$$

where the matrix $\Psi^{i,j}$ has elements given by $$\Psi^{i,j}_{l,m} = \sum_{k \neq l} f_{i,k} f^*_{j,m-l+k} = \sum_k f_{i,k} f^*_{j,m-l+k} = f_{i,l} f^*_{j,m},$$

and $\Phi$ denotes the covariance matrix for the other-cell interference and noise. The parameter $I_{oc}$ denotes the power of the other-cell interference and noise, and thus the diagonal elements of $\Phi$ are by definition equal to 1. Similarly, the correlation matrix of the vector $R_1$ is given by $$\Gamma_{R_1} = E(R_1 R_1^H) =$$
$$2N\left(\sum_{j=0}^{K-1} P_i \alpha_i\right) \Psi^{0,0} + 2N\left(\sum_{j=0}^{K-1} P_i(1-\alpha_i)\right) \Psi^{1,1} + 2N^2 P_1 f_1 f_1^H + 2N I_{oc} \Phi,$$

Let $I_{or}$ denote the power per chip received from the serving base station, which is given by $$I_{or} = \left(\sum_{j=0}^{K-1} P_i \alpha_i\right) \| f_0 \|^2 + \left(\sum_{j=0}^{K-1} P_i(1-\alpha_i)\right) \| f_1 \|^2.$$

Also, let $\Omega$ denote the normalized covariance matrix for both $R_0$ and $R_1$, which is given by $$\Omega = (\Gamma_{R_0} - \mu_{R_0}(s_0)\mu_{R_0}^H(s_0))/(2N I_{or}) = (\Gamma_{R_1} - \mu_{R_1}(s_1)\mu_{R_1}^H(s_1))/(2N I_{or})$$

$$= \left(\sum_{j=0}^{K-1} P_i \alpha_i\right) I_{or}^{-1} \Psi^{0,0} + \left(\sum_{j=0}^{K-1} P_i(1-\alpha_i)\right) I_{or}^{-1} \Psi^{1,1} + (I_{oc}/I_{or})\Phi.$$

For an arbitrary combining vector, v, the signal-to-noise ratio for symbol $s_0$, transmitted from the first antenna, is given by $$SNR_{OTD\_v\_s_0} = \frac{N(P_1/I_{or})\|f_0^H v\|^2}{v^H \Omega v}.$$

The matched filter receiver for a symbol, $s_0$, transmitted from the first antenna is $f_0$, and the signal-to-noise ratio for the matched-filter receiver is given by $$SNR_{OTD\_MF\_s_0} = \frac{N(P_1/I_{or})\|f_0\|^2}{f_0^H \Omega f_0}.$$

Similarly, the matched filter for symbol, $s_1$, transmitted from the second antenna is $f_1$, and the signal-to-noise ratio for this receiver is given by $$SNR_{OTD\_MF\_s_1} = \frac{N(P_1/I_{or})\|f_1\|^2}{f_1^H \Omega f_1}.$$

The MMSE receiver for $s_0$ satisfies the relations $$v_{OTD\_MMSE\_s_0} \propto \Gamma_{R_0}^{-1} f_0$$

$$\propto \Omega^{-1} f_0,$$

where the latter relation is proved using the matrix inverse lemma. The signal-to-noise ratio of the MMSE receiver for $s_0$ is given by $$SNR_{OTD\_MMSE\_s_0} = N(P_1/I_{or})f_0^H \Omega^{-1} f_0.$$

Similarly, the MMSE receiver for a symbol $s_1$ transmitted from the second antenna satisfies the relation $$v_{OTD\_MMSE\_s_1} \propto \Omega^{-1} f_1,$$

and the signal-to-noise ratio of the MMSE receiver for $s_1$ is given by $$SNR_{OTD\_MMSE\_s_1} = N(P_1/I_{or})f_1^H \Omega^{-1} f_1.$$

Note that if orthogonal transmit diversity is used for all of the code channels, so that $\alpha_i = \frac{1}{2}$ for all i, the intracell interference power $I_{or}$ becomes $$I_{or} = \left(\sum_{j=0}^{K-1} P_j\right)(\|f_0\|^2 + \|f_1\|^2),$$

and the interference covariance matrix $\Omega$ becomes $$\Omega = \left(I_{or}^{-1}\sum_{j=0}^{K-1} P_j/2\right)(\Psi^{0,0} + \Psi^{1,1}) + (I_{oc}/I_{or})\Phi.$$

With appropriate normalization of the powers $\{P_i\}$, the sum power of the channels $f_0$ and $f_1$ can be taken to be one, so that the $P_1/I_{or}$ is equal to the fraction of the power allocated by the base station to the first code channel. Thus, with this normalization and with all code channels using orthogonal transmit diversity, we have $$P_1/I_{or} = P_1 \Big/ \sum_{j=0}^{K-1} P_j, \text{ and}$$

$$\Omega = (\Psi^{0,0} + \Psi^{1,1})/2 + (I_{oc}/I_{or})\Phi.$$

Matched Filter and MMSE Receivers for Space-Time Transmit Diversity and Space Time Spreading Space-time transmit diversity (STTD) and space-time spreading (STS) are very closely related forms of transmit diversity. Space-time transmit diversity was first described by Alamouti in "A Simple Transmit Diversity Technique for Wireless Communications" IEEE Journal on Selected Area in Communications, vol. 16, pp 1451–1458, October 1998, and has been introduced into the 3GPP standard. Space-time spreading is a variation of STTD that has been introduced into the 3GPP2 standard. In fact, if implemented with a particular set of extended Walsh codes, STS is related to STTD by a simple mapping of the code symbols.

Both STTD and STS partition the encoded and interleaved symbols into pairs of symbols, $s_0$ and $s_1$. With STTD, the symbol pair is transmitted over two time slots using a single Walsh code. Conversely, with STS, the symbol pair is transmitted over a single time slot using two Walsh codes. The mappings used for STTD and STS are indicated in Table 1.

TABLE 1

Modulation Format for STTD and STS

| | STTD | | STS | |
| --- | --- | --- | --- | --- |
| | time 1 | time 2 | code 1 | code 2 |
| Antenna 1 | $s_0$ | $-s_1^*$ | $s_0$ | $-s_1^*$ |
| Antenna 2 | $s_1$ | $s_0^*$ | $s_1$ | $s_0^*$ |

Because STS requires two Walsh codes rather than the single Walsh code used for the STTD, some care is required in comparing the performance of these two diversity methods. In a fair comparison of STS and STTD, the same number of Walsh codes (same bandwidth) must be allocated to each method, and the overall symbol rate of the two methods must also be equal. The equal bandwidth and equal symbol rate requirements can be satisfied by using extended Walsh codes for STS. Thus, if the Walsh code w is assigned to a particular subscriber in the STTD implementation, the extended Walsh codes $w^0 = (w,-w)$ and $w^1 = (w,w)$ are assigned to the same subscriber in the STS implementation. With this assignment, STS uses the single Walsh code w, and the two symbols, $s_0$ and $s_1$, are transmitted over the period of two of these Walsh symbols. Note also that, since two extended Walsh codes are transmitted simultaneously in the STS implementation, the power allocated to each of these code channels must be equal to one-half of the power allocated to the single code channel in the STTD implementation.

With the above description of STS and STTD, the observation vectors $R_0$ and $R_1$ used in the demodulation of the symbols $s_0$ and $s_1$ can now be defined for each of the two diversity methods. For STTD, the vectors $R_0$ and $R_1$ result from the correlation of the received sequence $\{r_k\}$ with the complex spreading code of the serving base station and the code channel of interest in the first and second time intervals, respectively. Specifically, the vectors $R_0$ and $R_1$, are defined such that $$R_{0,l} = \sum_{i=1}^{N} r_{i+l} c_i^* w_i$$

$$R_{1,l} = \sum_{i=1}^{N} r_{N+i+l} c_{N+i}^* w_i,$$

for l in the interval [0, M−1]. For STS, the vectors $R_0$ and $R_1$ result from the correlation of the received sequence $\{r_k\}$ with the complex spreading code of the serving base station and the first and second extended Walsh codes, respectively. Thus, if the first and second code channels $w^0 = (w, -w)$ and $w^1 = (w, w)$, the vectors $R_0$ and $R_1$ are defined such that $$R_{0,l} = \sum_{i=1}^{2N} r_{i+l} c_i^* w_i^0 = \sum_{i=1}^{N} r_{i+l} c_i^* w_i - \sum_{i=1}^{N} r_{N+i+l} c_{N+i}^* w_i$$

$$R_{1,l} = \sum_{i=1}^{2N} r_{i+l} c_i^* w_i^1 = \sum_{i=1}^{N} r_{i+l} c_i^* w_i + \sum_{i=1}^{N} r_{N+i+l} c_{N+i}^* w_i,$$

for l in the interval [0, M−1]. For both STTD and STS, the vectors $R_0$ and $R_1$ can be defined more generally on a set of delays that are possibly non-consecutive and may also lie outside the interval [0, M−1]. However, for the remainder of this paper, the above definitions will be used.

The performance of STTD and STS can be shown to be exactly the same for both the matched-filter receiver and the MMSE receiver. Furthermore, with the exception of some very minor differences, the analysis of the matched-filter and MMSE receivers is the same for these two diversity methods. Thus, in the remainder of this section, only STTD will be considered in the discussion of the matched-filter and MMSE receivers and their respective performance.

Let Q denote the vertical concatenation of the two vectors $R_0$ and $R_1^*$ so that $$Q = \begin{bmatrix} R_0 \\ R_1^* \end{bmatrix}$$

The expected value of the product of Q and the conjugates of $s_0$ and $s_1$, respectively are given by $$\mu_Q(s_0) = E(Q s_0^*) = N\sqrt{P_1/2} \begin{bmatrix} f_0 \\ f_1^* \end{bmatrix}$$

$$\mu_Q(s_1) = E(Q s_1^*) = N\sqrt{P_1/2} \begin{bmatrix} f_1 \\ -f_0^* \end{bmatrix}$$

The correlation matrix $\Gamma_Q$ is given by $$\Gamma_Q = E(QQ^H) = E\left\{ \begin{bmatrix} R_0 R_0^H & R_0 R_1^T \\ R_1^* R_0^H & R_1^* R_1^T \end{bmatrix} \right\}.$$

where $$E(R_0 R_0^H) = N\left(\sum_{j=1}^{K} P_i \alpha_i\right)\Psi^{0,0} + N\left(\sum_{j=1}^{K} P_i(1-\alpha_i)\right)\Psi^{1,1} +$$
$$N^2(P_1/2)(f_0 f_0^H + f_1 f_1^H) + N I_{oc} \Phi,$$

$$E(R_1 R_1^H) = N\left(\sum_{j=1}^{K} P_i \alpha_i\right)\Psi^{0,0} + N\left(\sum_{j=1}^{K} P_i(1-\alpha_i)\right)\Psi^{1,1} +$$
$$N^2(P_1/2)(f_0 f_0^H + f_1 f_1^H) + N I_{oc} \Phi,$$

and $$E(R_0 R_1^T) = N^2(P_1/2)(f_0 f_1^T - f_1 f_0^T),$$
$$E(R_1^* R_0^H) = N^2(P_1/2)(-f_0^* f_1^H + f_1^* f_0^H).$$

The matrices $\Psi^{0,0}$, $\Psi^{1,1}$, and $\Phi$ are as defined in Section 2. Let the matrix $\Omega$ also be defined as in Section 2 and note that, as before, the power per chip received from the serving base station, $I_{or}$, is given by $$I_{or} = \left(\sum_{j=0}^{K-1} P_i \alpha_i\right)\|f_0\|^2 + \left(\sum_{j=0}^{K-1} P_i(1-\alpha_i)\right)\|f_1\|^2.$$

With these definitions, the normalized correlation matrix can be expressed as $$\frac{\Gamma_Q}{N I_{or}} = \begin{bmatrix} \Omega & 0 \\ 0 & \Omega^* \end{bmatrix} + \frac{N P_1}{2 I_{or}}\left(\begin{bmatrix} f_0 \\ f_1^* \end{bmatrix}\begin{bmatrix} f_0 \\ f_1^* \end{bmatrix}^H + \begin{bmatrix} f_1 \\ -f_0^* \end{bmatrix}\begin{bmatrix} f_1 \\ -f_0^* \end{bmatrix}^H\right).$$

The matched-filter receiver for symbol $s_0$ is given by $$v_{\text{STTD\_MF\_}s_0} = \begin{bmatrix} f_0 \\ f_1^* \end{bmatrix}.$$

The signal-to-noise ratio for the matched filter receiver is given by $$SNR_{\text{STTD\_MF\_}s_0} = \frac{(N P_1 / 2 I_{or})(f_0^H f_0 + f_1^H f_1)^2}{\begin{bmatrix} f_0 \\ f_1^* \end{bmatrix}^H \frac{\Gamma}{N I_{or}} \begin{bmatrix} f_0 \\ f_1^* \end{bmatrix} - \frac{N P_1}{2 I_{or}}(f_0^H f_0 + f_1^H f_1)^2}$$

$$= \frac{N(P_1 / 2 I_{or})(f_0^H f_0 + f_1^H f_1)^2}{f_0^H \Omega f_0 + f_1^H \Omega f_1}.$$

Similarly, the matched-filter receiver for $s_1$ is given by $$v_{\text{STTD\_MF\_}s_1} = \begin{bmatrix} f_1 \\ -f_0^* \end{bmatrix},$$

and the signal-to-noise ratio for this matched filter receiver is given by $$SNR_{\text{STTD\_MF\_}s_1} = \frac{(N P_1 / 2 I_{or})(f_1^H f_1 + f_0^H f_0)^2}{\begin{bmatrix} f_1 \\ -f_0^* \end{bmatrix}^H \frac{\Gamma}{N I_{or}} \begin{bmatrix} f_1 \\ -f_0^* \end{bmatrix} - \frac{N P_1}{2 I_{or}}(f_0^H f_0 + f_1^H f_1)^2}$$

$$= \frac{N(P_1 / 2 I_{or})(f_1^H f_1 + f_0^H f_0)^2}{f_1^H \Omega f_1 + f_0^{H*} \Omega^* f_0^*}$$

$$= SNR_{\text{STTD\_MF\_}s_0}.$$

Thus, the signal-to-noise ratio expressions for the matched-filter detection of $s_0$ and $s_1$ are identical.

General conditions under which the received signal-to-noise ratios of the symbols $s_0$ and $s_1$ are identical can be easily described. Let the receivers for symbols $s_0$ and $s_1$ be denoted by $$v_{s_0} = \begin{bmatrix} v_{s_0}^u \\ v_{s_0}^l \end{bmatrix}, v_{s_1} = \begin{bmatrix} v_{s_1}^u \\ v_{s_1}^l \end{bmatrix}.$$

From the expressions given above for the mean and variance of Q, a sufficient condition can be derived for these receivers to yield decision statistics with equal signal-to-noise ratios. The sufficient condition is that $$v_{s_1}^u = (v_{s_0}^l)^*, \quad v_{s_1}^l = -(v_{s_0}^u)^*.$$

The MMSE receiver for $s_0$ satisfies the relations $$v_{STTD\_MMSE\_s_0} \propto \frac{\Gamma^{-1}}{NI_{or}} \begin{bmatrix} f_0 \\ f_1^* \end{bmatrix}$$

$$\propto \begin{bmatrix} \Omega^{-1} & 0 \\ 0 & (\Omega^{-1})^* \end{bmatrix} \begin{bmatrix} f_0 \\ f_1^* \end{bmatrix}.$$

where the latter relation is proved with repeated use of the matrix inverse lemma. With this expression, the signal-to-noise ratio for the MMSE receiver can be written as $$SNR_{STTD\_MMSE\_s_0} = \frac{\frac{NP_1}{2I_{or}}\left(\begin{bmatrix} f_0 \\ f_1^* \end{bmatrix}^H \begin{bmatrix} \Omega^{-1} & 0 \\ 0 & (\Omega^{-1})^* \end{bmatrix} \begin{bmatrix} f_0 \\ f_1^* \end{bmatrix}\right)^2}{\left\{\begin{bmatrix} f_0 \\ f_1^* \end{bmatrix}^H \begin{bmatrix} \Omega^{-1} & 0 \\ 0 & (\Omega^{-1})^* \end{bmatrix} \frac{\Gamma}{NI_{or}} \begin{bmatrix} \Omega^{-1} & 0 \\ 0 & (\Omega^{-1})^* \end{bmatrix} \begin{bmatrix} f_0 \\ f_1^* \end{bmatrix} - \frac{NP_1}{2I_{or}}\left(\begin{bmatrix} f_0 \\ f_1^* \end{bmatrix}^H \begin{bmatrix} \Omega^{-1} & 0 \\ 0 & (\Omega^{-1})^* \end{bmatrix} \begin{bmatrix} f_0 \\ f_1^* \end{bmatrix}\right)^2\right\}}$$

$$= N(P_1/2I_{or})(f_0^H \Omega^{-1} f_0 + f_1^H \Omega^{-1} f_1).$$

Similarly, the MMSE receiver for $s_1$ satisfy the relations $$v_{STTD\_MMSE\_s_1} = \frac{\Gamma^{-1}}{NI_{or}} \begin{bmatrix} f_1 \\ -f_0^* \end{bmatrix}$$

$$\propto \begin{bmatrix} \Omega^{-1} & 0 \\ 0 & (\Omega^{-1})^* \end{bmatrix} \begin{bmatrix} f_1 \\ -f_0^* \end{bmatrix}.$$

The signal-to-noise ratio resulting from the use of the MMSE receiver for $s_1$ is given by $$SNR_{STTD\_MMSE\_s_1} = \frac{\frac{NP_1}{2I_{or}}\left(\begin{bmatrix} f_1 \\ -f_0^* \end{bmatrix}^H \begin{bmatrix} \Omega^{-1} & 0 \\ 0 & (\Omega^{-1})^* \end{bmatrix} \begin{bmatrix} f_1 \\ -f_0^* \end{bmatrix}\right)^2}{\left\{\begin{bmatrix} f_1 \\ -f_0^* \end{bmatrix}^H \begin{bmatrix} \Omega^{-1} & 0 \\ 0 & (\Omega^{-1})^* \end{bmatrix} \frac{\Gamma}{NI_{or}} \begin{bmatrix} \Omega^{-1} & 0 \\ 0 & (\Omega^{-1})^* \end{bmatrix} \begin{bmatrix} f_1 \\ -f_0^* \end{bmatrix} - N\frac{E_c}{I_{or}}\left(\begin{bmatrix} f_1 \\ -f_0^* \end{bmatrix}^H \begin{bmatrix} \Omega^{-1} & 0 \\ 0 & (\Omega^{-1})^* \end{bmatrix} \begin{bmatrix} f_1 \\ -f_0^* \end{bmatrix}\right)^2\right\}}$$

$$= N(P_1/2I_{or})(f_0^H \Omega^{-1} f_0 + f_1^H \Omega^{-1} f_1)$$

$$= SNR_{STTD\_MMSE\_s_0},$$

and thus the signal-to-noise ratios of the MMSE receivers for $s_0$ and $s_1$ are equal.

With trivial modifications of the above analysis, the expressions for the STTD MMSE receivers can be shown to be identical to the expressions given above for the STS MMSE receiver. That is, $$\hat{s}_0 = (v_{STS\_MMSE\_s_0})^H \begin{bmatrix} R_0 \\ R_1^* \end{bmatrix} \quad \hat{s}_1 = (v_{STS\_MMSE\_s_1})^H \begin{bmatrix} R_0 \\ R_1^* \end{bmatrix},$$

where $$v_{STS\_MMSE\_s_0} \propto \begin{bmatrix} \Omega^{-1} & 0 \\ 0 & (\Omega^{-1})^* \end{bmatrix} \begin{bmatrix} f_0 \\ f_1^* \end{bmatrix},$$

and $$v_{STS\_MMSE\_s_1} \propto \begin{bmatrix} \Omega^{-1} & 0 \\ 0 & (\Omega^{-1})^* \end{bmatrix} \begin{bmatrix} f_1 \\ -f_0^* \end{bmatrix}.$$

Of course, as noted previously, $R_0$ ands $R_1$ are defined slightly differently for STS than for STTD.

An example illustrating the relative performance of the MMSE and matched-filter receivers for STTD is given in FIG. 1. In this example, the first channel has two non-zero taps and is given by $f_0 = \{0, \ldots, 0, 0.5, 0.5, 0, \ldots 0\}$, while the second channel has a single non-zero tap, and is given by $f_1 = \{0, \ldots, 0, 0.71, 0, 0, \ldots 0\}$. Note that the energy of both channels is equal to ½. The other-cell interference is assumed to have a correlation function with values $\{\ldots, 0, 0.4, 1, 0.4, 0, \ldots\}$.

In this example, a separate 15-tap MMSE equalizer is allocated to each of the transmit antennas. FIG. 1 indicates the gain in signal-to-noise ratio of the MMSE receiver relative to the matched-filter receiver as a function of the ratio $I_{oc}/I_{or}$. For this example, the MMSE receiver performs 1.5 to 2 dB better than the matched-filter receiver.

Performance Comparison of OTD with STTD/STS

With the signal-to-noise ratio expressions derived in the previous section, several observations can be made regarding the relative performance of OTD and STTD/STS. The signal-to-noise ratio performance of the matched-filter receiver for OTD and STTD/STS can be summarized in the following expressions:

$$SNR_{OTD\_MF\_s_0} = \frac{N(P_1/I_{or})(f_0^H f_0)^2}{f_0^H \Omega f_0}$$

-continued $$SNR_{OTD\_MF\_s_1} = \frac{N(P_1/I_{or})(f_1^H f_1)^2}{f_1^H \Omega f_1}$$

$$SNR_{STS\_MF\_s_0} = SNR_{STS\_MF\_s_1} = \frac{N(P_1/2I_{or})(f_0^H f_0 + f_1^H f_1)^2}{f_0^H \Omega f_0 + f_1^H \Omega f_1}.$$

With the above expressions, it claim can be easily proved that $$SNR_{OTD\_MF\_s_0} + SNR_{OTD\_MF\_s_1} \geq SNR_{STTD\_MF\_s_0} + SNR_{STTD\_MF\_s_1} = 2SNR_{STTD\_MF\_s_0},$$

with equality if and only if $$(f_0^H f_0)(f_1^H \Omega f_1) = (f_1^H f_1)(f_0^H \Omega f_0).$$

The meaning of this inequality is that the sum signal-to-noise ratio for matched filter reception of OTD is always greater than or equal to the sum signal-to-noise ratio for matched-filter reception of STTD/STS. This result is perhaps somewhat surprising, since the generally held belief is that STTD/STS always performs better than OTD. There are two possible interpretations of this result. The first interpretation is that the sum signal-to-noise ratio for OTD is superior to that of STS and STTD because it creates a more favorable interference environment. The second interpretation is that matched filter reception is more nearly optimal for OTD than for STS or STTD. In light of the results given below for the MMSE receiver, it seems that the correct interpretation is that the matched filter receiver is more nearly optimal for OTD than for STTD/STS.

For uncoded binary modulation, the average bit error rate for STTD/STS will be less than that for OTD if the following inequality is satisfied:

$$Q\left((2SNR_{STS\_MF\_s_0})^{\frac{1}{2}}\right) \leq \frac{1}{2} Q\left((2SNR_{OTD\_MF\_s_0})^{\frac{1}{2}}\right) + \frac{1}{2} Q\left((2SNR_{OTD\_MF\_s_1})^{\frac{1}{2}}\right).$$

A necessary (but not sufficient) condition for the average uncoded bit error rate of STTD/STS to be less than the average uncoded error probability of OTD is the following:

$$\min\{SNR_{OTD\_MF\_s_0}, SNR_{OTD\_MF\_s_1}\} \leq SNR_{STS\_MF\_s_0}.$$

In general, it appears that not even this weaker inequality will always be satisfied. However, it seems likely that both inequalities will be satisfied for most channel pairs $f_0$ and $f_1$.

The signal-to-noise ratio performance of the MMSE receiver for OTD and STTD/STS can be summarized in the following expressions:

$$SNR_{OTD\_MMSE\_s_0} = N(P_1/I_{or})(f_0^H \Omega^{-1} f_0)$$

$$SNR_{OTD\_MMSE\_s_1} = N(P_1/I_{or})(f_1^H \Omega^{-1} f_1).$$

$$SNR_{STTD\_MMSE\_s_0} = SNR_{STTD\_MMSE\_s_1} = N(P_1/2I_{or})(f_0^H \Omega^{-1} f_0 + f_1^H \Omega^{-1} f_1).$$

Thus, for the MMSE receiver $$SNR_{OTD\_MMSE\_s_0} + SNR_{OTD\_MMSE\_s_1} = 2SNR_{STTD\_MMSE\_s_0},$$

and the sum signal-to-noise ratio for OTD is exactly equal to the sum signal-to-noise ratio for STTD/STS. Since the two STTD/STS sub-channels have the same signal-to-noise ratio, the following inequality holds for all channel pairs $f_0$ and $f_1$:

$$\min\{SNR_{OTD\_MMSE\_s_0}, SNR_{OTD\_MMSE\_s_1}\} \leq SNR_{STTD\_MMSE\_s_0}.$$

Similarly, for the MMSE receiver, the average uncoded bit error probability (binary modulation) for STTD/STS can be shown to be less than or equal to the average bit error probability for OTD. Thus, $$Q\left((2SNR_{STTD\_MMSE\_s_0})^{\frac{1}{2}}\right) \leq \frac{1}{2} Q\left((2SNR_{OTD\_MMSE\_s_0})^{\frac{1}{2}}\right) + \frac{1}{2} Q\left((2SNR_{OTD\_MMSE\_s_1})^{\frac{1}{2}}\right).$$

Alternative Implementations of the MMSE Receiver for Transmit Diversity

Two basic architectures exist for the implementation of the MMSE receivers for OTD, STS, and STTD. In the first implementation, which we shall refer to as the correlator implementation, the receiver correlates delayed versions of the received signal with the product of the long spreading code and the Walsh code or codes corresponding to the data channel of interest. The correlations are performed at a set of delays that generally correspond to the set of multipath delays introduced by the channel. For each of the data subchannels $s_0$ and $s_1$, a vector of correlations (the previously described observation vector for the data subchannel) is passed to the MMSE receiver for that subchannel. In this implementation, the MMSE receiver employs a complex-valued MMSE weighting vector with length equal to the length of the observation vector. The MMSE receiver forms an estimate of the subchannel data symbol by taking the inner product of the MMSE weighting vector and the observation vector. By definition, the MMSE weighting vector is chosen (as derived previously) so as to minimize the mean-square error of the symbol estimate.

The second implementation of the MMSE receiver will be referred to as the filter implementation. The filter implementation of the MMSE receiver is achieved by interchanging the order of the correlation (or despreading) operation and the application of the MMSE weighting vector. In this implementation, the received signal is filtered with the time-reverse of the MMSE weighting vector. For OTD a single filter is required per data subchannel. For STTD and STS, two filters are required per data subchannel, but the same two filters are required (and thus can be shared) by the two data subchannels. The sequences at the output of these filters are correlated with the product of the long spreading sequence and the code channel (or channels) of interest. For OTD, the two subchannels can be demodulated with a total of two correlators, each of length 2N. For STTD and STS, the two subchannels can be demodulated with a total of four correlators, each of length N (STTD) and 2N (STS), respectively.

The advantage of the filter implementation of the MMSE receiver is that additional data channels can be demodulated with very little additional complexity. No extra filters are required to demodulate the additional code channels. The filter implementation of the MMSE receiver for OTD permits the demodulation of each additional data channel with two correlators, each of length 2N. The filter implementation of STTD and STS permit the demodulation of each additional data channel with four correlators, each of length N (STTD) and 2N (STS), respectively. In contrast, the complexity of the correlator implementation of the MMSE receiver scales approximately linearly with the number of data channels demodulated.

Efficient Implementation of the MMSE Receiver for OTD

In the previous analysis of OTD, the sequence $\{r_k\}$ was reduced to a pair of vectors, $R_0$ and $R_1$, by despreading this sequence with the complex spreading code, $\{c_k\}$ of the serving base station, and correlating with the code channel of interest. Recall that $R_0$ and $R_1$ were defined as $$R_{0,l} = \sum_{i=1}^{2N} r_{i+l} c_i^* w_i^0$$

$$R_{1,l} = \sum_{i=1}^{2N} r_{i+l} c_i^* w_i^1$$

for l in the interval [0, M−1], so that these vectors are of length M. More generally, the vectors $R_0$ and $R_1$ may be defined on a set of delays which are possibly non-consecutive and may also lie outside the interval [0, M−1].

The above definition applies to a particular Walsh code and a particular time interval. More generally, we consider an arbitrary Walsh code and an arbitrary symbol interval. Let $R_0(m,n)$ and $R_1(m,n)$ denote the observation vectors for the m-th Walsh code and the n-th time interval. Let $w_{ij}$ denote the j-th chip of the i-th Walsh code. The components of the observation vectors $R_0(m,n)$ and $R_1(m,n)$ are then given by $$R_{0,l}(m, n) = \sum_{i=1}^{2N} r_{2nN+i+l} c_{2nN+i}^* w_{m,i}^0$$

$$R_{1,l}(m, n) = \sum_{i=1}^{2N} r_{2nN+i+l} c_{2nN+i}^* w_{m,i}^1.$$

The MMSE estimates of the symbols transmitted using the m-th Walsh code in the n-th time interval are given by $$\hat{s}_0(m,n) = (\Omega^{-1} f_0)^H R_0(m,n) \quad \hat{s}_1(m,n) = (\Omega^{-1} f_1)^H R_1(m,n).$$

The above expressions for $\hat{s}_0(m,n)$ and $\hat{s}_1(m,n)$ describe the correlation form of the MMSE receiver for OTD. As indicated in the above definitions, 2M correlations of length 2N are required in order to compute the vectors $R_0(m,n)$ and $R_1(m,n)$. The MMSE estimates of $\hat{s}_0(m,n)$ and $\hat{s}_1(m,n)$ are formed by computing the indicated inner products of the MMSE weighting vectors $\Omega^{-1} f_0$ and $\Omega^{-1} f_1$ with the corresponding observation vectors $R_0(m,n)$ and $R_1(m,n)$.

The development of the filter implementation of the OTD receiver is straightforward. Let $g_0 = \Omega^{-1} f_0$, and note that the expression for $\hat{s}_0(m,n)$ can be written as $$\hat{s}_0(m, n) = \sum_{k=0}^{M-1} g_{0,l}^* R_{0,k}(m, n)$$

$$= \sum_{l=0}^{M-1} g_{0,l}^* \left( \sum_{i=1}^{2N} r_{2nN+i+l} c_{2nN+i}^* w_{m,i}^0 \right)$$

$$= \sum_{i=1}^{2N} c_{2nN+i}^* w_{m,i}^0 \left( \sum_{l=0}^{M-1} g_{0,l}^* r_{2nN+i+l} \right)$$

$$= \sum_{i=1}^{2N} c_{2nN+i}^* w_{m,i}^0 (\tilde{g}_0 * r(2nN + i))$$

where $\tilde{g}hd\ 0,k \equiv g^*_{0,-k}$ and * denotes convolution. Similarly, let $g_1 = \Omega^{-1} f_1$ and note that $$\hat{s}_1(m, n) = \sum_{k=0}^{M-1} g_{0,l}^* R_{1,k}(m, n)$$

$$= \sum_{l=0}^{M-1} g_{0,l}^* \left( \sum_{i=1}^{2N} r_{2nN+i+l} c_{2nN+i}^* w_{m,i}^1 \right)$$

$$= \sum_{i=1}^{2N} c_{2nN+i}^* w_{m,i}^1 \left( \sum_{l=0}^{M-1} g_{0,l}^* r_{2nN+i+l} \right)$$

$$= \sum_{i=1}^{2N} c_{2nN+i}^* w_{m,i}^1 (\tilde{g}_0 * r(2nN + i))$$

where $\tilde{g}hd\ 1,k \equiv g^*_{1,-k}$.

Figure 4:
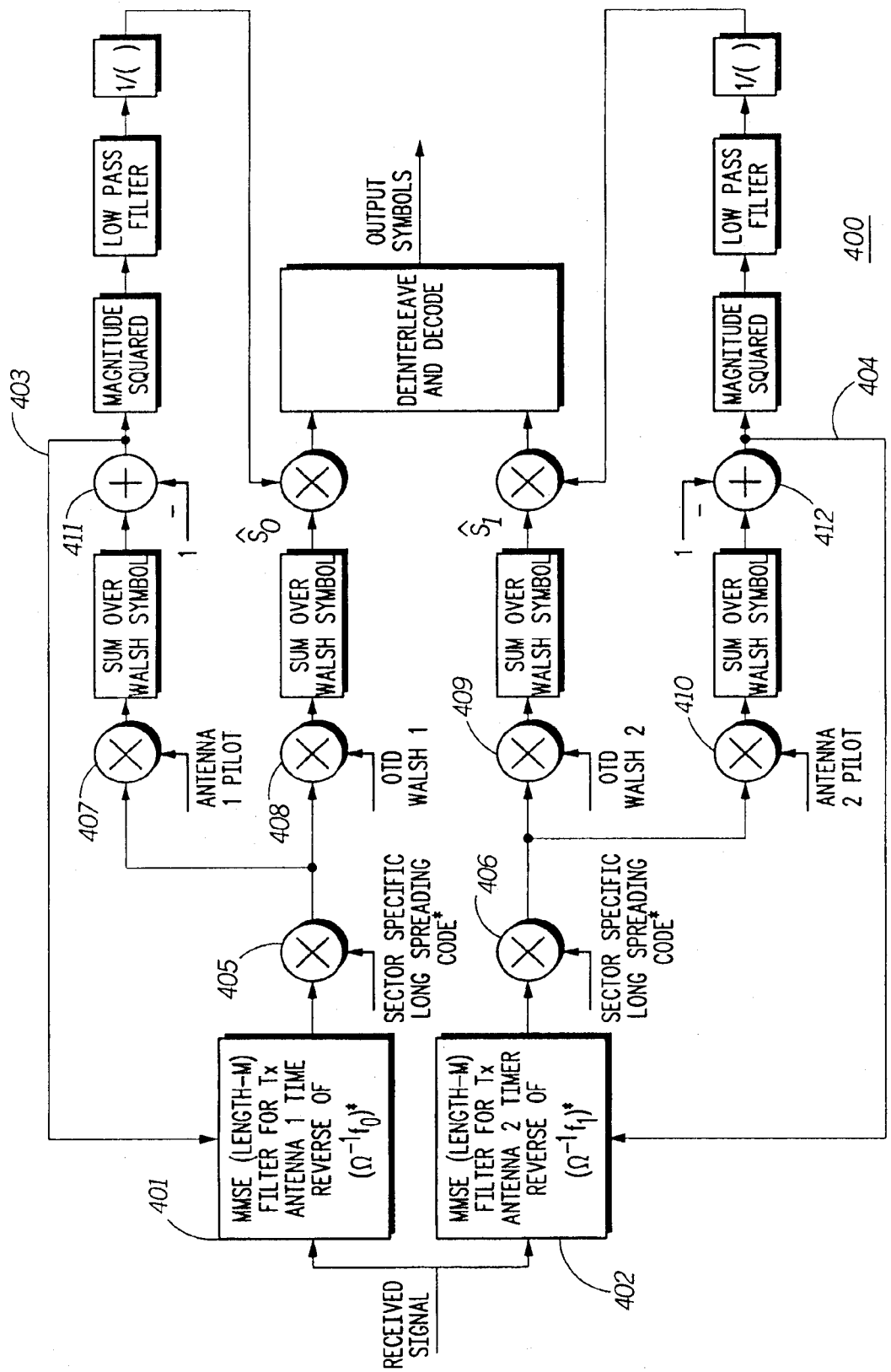
FIG. 4 through FIG. 10 illustrate MMSE receivers in accordance with various embodiments of the present invention.
Figure 5:
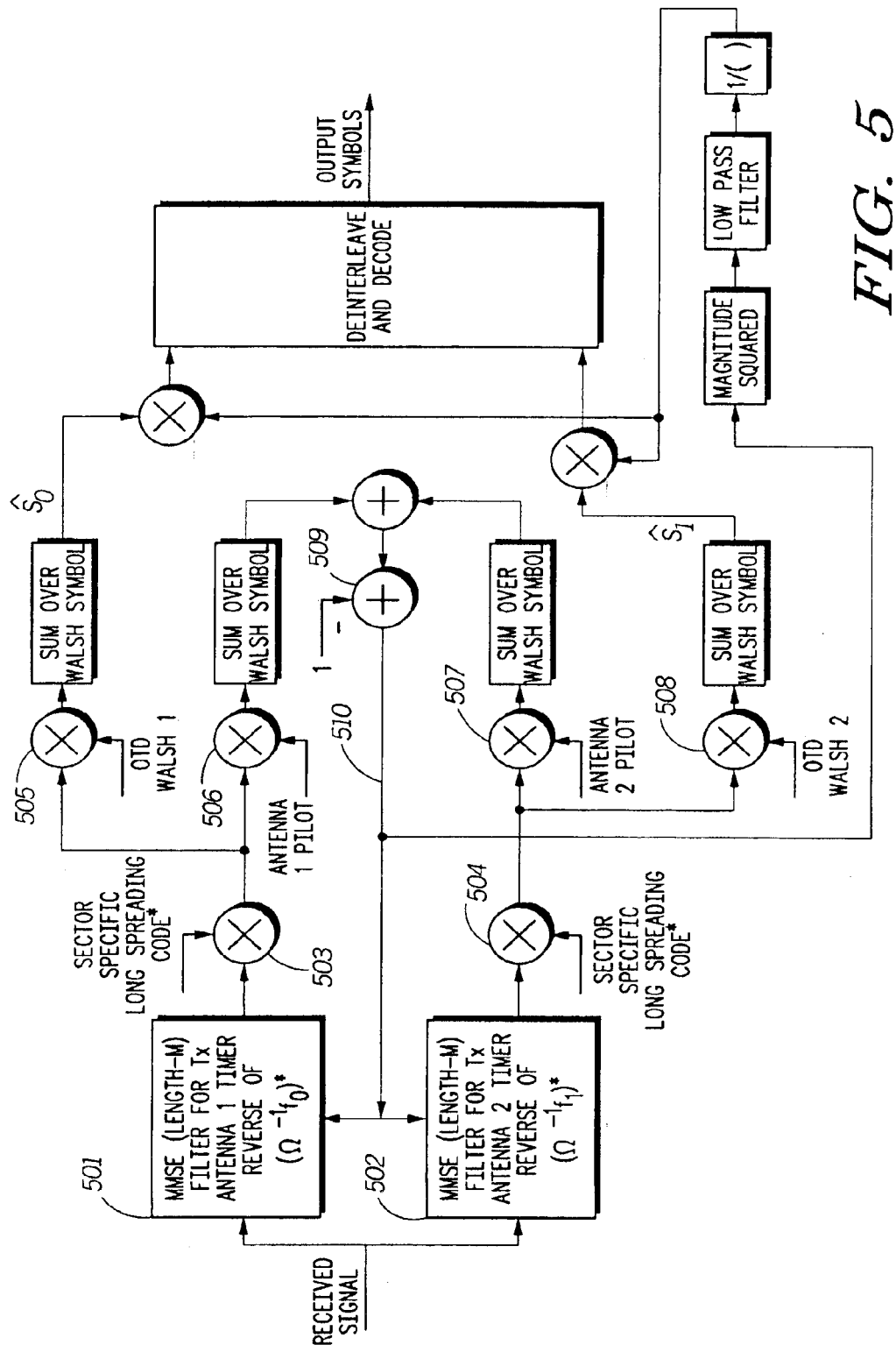

From these expressions, it is apparent that the estimates $\hat{s}_0(m,n)$ and $\hat{s}_1(m,n)$ can be computed by first filtering the received sequence $\{r_k\}$ with the conjugate of the time reverse of $\Omega^{-1} f_0$ and $\Omega^{-1} f_1$, respectively, and then correlating the filter output with Walsh code channel and subchannel ($s_0$ or $s_1$) of interest. Note that the filter implementation is preferred because it greatly reduces the complexity associated with the demodulation of multiple Walsh code channels. If it is necessary to demodulate additional code channels, such as the pilot channel or additional data channels, each additional channel can be demodulated with the use of two additional length-2N correlation operations (one for subchannel $s_0$ and one for subchannel $s_1$). Conversely, in the correlation implementation, 2M correlation operations are required for each additional code channel that is demodulated. The filter implementation of the MMSE OTD receiver is illustrated in FIG. 4 and FIG. 5.

Efficient Implementation of the MMSE Receiver for STTD

In the previous analysis of STTD, the sequence $\{r_k\}$ was reduced to a pair of vectors, $R_0$ and $R_1$, in the following fashion $$R_{0,l} = \sum_{i=1}^{N} r_{i+l} c_i^* w_i$$

$$R_{1,l} = \sum_{i=1}^{N} r_{N+i+l} c_{N+i}^* w_i,$$

for l in the interval [0, M−1], so that these vectors are of length M. More generally, the vectors $R_0$ and $R_1$ may be defined on a set of delays which are possibly non-consecutive and may also lie outside the interval [0, M−1]. The above definition is applies to a particular Walsh code and a particular time interval. More generally, we consider an arbitrary Walsh code and an arbitrary symbol interval. Let $R_0(m,n)$ and $R_1(m,n)$ denote the observation vectors for the m-th Walsh code and the n-th time interval. As above, let $w_{ij}$ denote the j-th chip of the i-th Walsh code. The components of the observation vectors $R_0(m,n)$ and $R_1(m,n)$ are then given by $$R_{0,l}(m, n) = \sum_{i=1}^{N} r_{2nN+i+l} c_{2nN+i}^* w_{m,i}$$

$$R_{1,l}(m, n) = \sum_{i=1}^{N} r_{(2n+1)N+i+l} c_{(2n+1)N+i}^* w_{m,i}.$$

The MMSE estimates of the symbols transmitted using the m-th Walsh code in the n-th time interval are given by $$\hat{s}_0(m, n) = \left( \begin{bmatrix} \Omega^{-1} & 0 \\ 0 & (\Omega^{-1})^* \end{bmatrix} \begin{bmatrix} f_0 \\ f_1^* \end{bmatrix} \right)^H \begin{bmatrix} R_0(m, n) \\ R_1^*(m, n) \end{bmatrix}$$

$$\hat{s}_1(m, n) = \left( \begin{bmatrix} \Omega^{-1} & 0 \\ 0 & (\Omega^{-1})^* \end{bmatrix} \begin{bmatrix} f_1 \\ -f_0^* \end{bmatrix} \right)^H \begin{bmatrix} R_0(m, n) \\ R_1^*(m, n) \end{bmatrix}$$

The above expressions for $\hat{s}_0(m,n)$ and $\hat{s}_1(m,n)$ describe the correlation form of the MMSE receiver for STTD. As indicated in the above definitions, 2M correlations of length N are required in order to compute the vectors $R_0(m,n)$ and $R_1(m,n)$. The MMSE estimates of $\hat{s}_0(m,n)$ and $\hat{s}_1(m,n)$ are formed by computing the indicated inner products between the length-2M MMSE weighting vectors and the corresponding length-2M observation vectors.

The development of the filter implementation of the STTD receiver is straightforward. As above, let $g_0 = \Omega^{-1} f_0$ and $g_1 = \Omega^{-1} f_1$. Note that $\hat{s}_0(m,n)$ can be written as $$\hat{s}_0(m, n) = g_0^H R_0(m, n) + (g_1^H)^* R_1^*(m, n)$$

$$= \sum_{l=0}^{M-1} g_{0,l}^* \sum_{i=1}^{N} r_{2nN+i+l} c_{2nN+i}^* w_{m,i} +$$

$$\sum_{l=0}^{M-1} g_{1,l} \sum_{i=1}^{N} r_{(2n+1)N+i+l}^* c_{(2n+1)N+i} w_{m,i}$$

$$= \sum_{i=1}^{N} c_{2nN+i}^* w_{m,i} \sum_{l=0}^{M-1} g_{0,l}^* r_{2nN+i+l} +$$

$$\sum_{i=1}^{N} c_{(2n+1)N+i} w_{m,i} \sum_{l=0}^{M-1} g_{1,l} r_{(2n+1)N+i+l}^*$$

$$= \sum_{i=1}^{N} c_{2nN+i}^* w_{m,i} (\tilde{g}_0 * r(2nN + i)) +$$

$$\left( \sum_{i=1}^{N} c_{(2n+1)N+i}^* w_{m,i} (\tilde{g}_1 * r((2n+1)N + i)) \right)^*$$

where $\tilde{g}_0$ and $\tilde{g}_1$ were defined previously. Similarly, we have $$\hat{s}_1(m, n) = g_1^H R_0(m, n) - (g_0^H)^* R_1^*(m, n)$$

$$= \sum_{l=0}^{M-1} g_{1,l}^* \sum_{i=1}^{N} r_{2nN+i+l} c_{2nN+i}^* w_{m,i} -$$

$$\sum_{l=0}^{M-1} g_{0,l} \sum_{i=1}^{N} r_{(2n+1)N+i+l}^* c_{(2n+1)N+i} w_{m,i}$$

$$= \sum_{i=1}^{N} c_{2nN+i}^* w_{m,i} \sum_{l=0}^{M-1} g_{1,l}^* r_{2nN+i+l} -$$

$$\sum_{i=1}^{N} c_{(2n+1)N+i} w_{m,i} \sum_{l=0}^{M-1} g_{0,l} r_{(2n+1)N+i+l}^*$$

$$= \sum_{i=1}^{N} c_{2nN+i}^* w_{m,i} (\tilde{g}_1 * r(2nN + i)) -$$

$$\left( \sum_{i=1}^{N} c_{(2n+1)N+i}^* w_{m,i} (\tilde{g}_0 * r((2n+1)N + i)) \right)^*.$$

Figure 6:
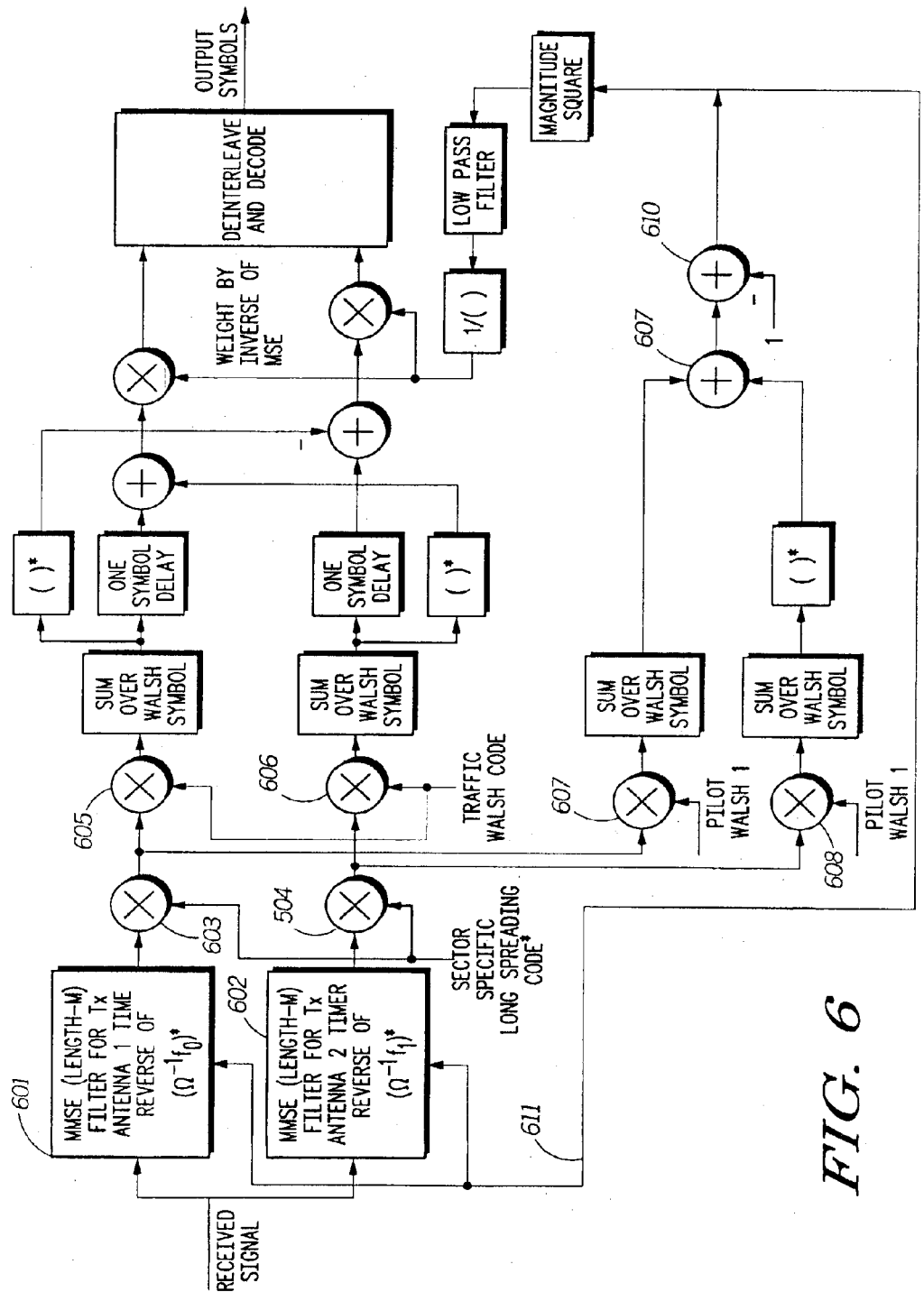

Note that that the two symbol estimates $\hat{s}_0(m,n)$ and $\hat{s}_1(m,n)$ can be written entirely in terms of the convolutions $\tilde{g}_0 * r(\cdot)$ and $\tilde{g}_1 * r(\cdot)$. As with OTD, the filter implementation is preferred because it greatly reduces the complexity associated with the demodulation of multiple Walsh code channels. The filter implementation of the MMSE STTD receiver is illustrated in FIG. 6.

Efficient Implementation of the MMSE Receiver for STS

In the previous analysis of STTD, the sequence $\{r_k\}$ was reduced to a pair of vectors, $R_0$ and $R_1$, in the following fashion $$R_{0,l} = \sum_{i=1}^{2N} r_{i+l} c_i^* w_i^0$$

$$R_{1,l} = \sum_{i=1}^{2N} r_{i+l} c_i^* w_i^1,$$

for l in the interval [0, M−1], so that these vectors are of length M. More generally, the vectors $R_0$ and $R_1$ may be defined on a set of delays which are possibly non-consecutive and may also lie outside the interval [0, M−1]. The above definition is applies to a particular Walsh code and a particular time interval. More generally, we consider an arbitrary Walsh code and an arbitrary symbol interval. Let $R_0(m,n)$ and $R_1(m,n)$ denote the observation vectors for the m-th Walsh code and the n-th time interval. As above, let $w_{ij}$ denote the j-th chip of the i-th Walsh code. The components of the observation vectors $R_0(m,n)$ and $R_1(m,n)$ are then given by $$R_{0,l}(m, n) = \sum_{i=1}^{2N} r_{2nN+i+l} c_{2nN+i}^* w_{m,i}^0$$

$$R_{1,l}(m, n) = \sum_{i=1}^{2N} r_{2nN+i+l} c_{2nN+i}^* w_{m,i}^1,$$

The MMSE estimates of the symbols transmitted using the m-th Walsh code in the n-th time interval are given by $$\hat{s}_0(m, n) = \left( \begin{bmatrix} \Omega^{-1} & 0 \\ 0 & (\Omega^{-1})^* \end{bmatrix} \begin{bmatrix} f_0 \\ f_1^* \end{bmatrix} \right)^H \begin{bmatrix} R_0(m, n) \\ R_1^*(m, n) \end{bmatrix}$$

$$\hat{s}_1(m, n) = \left( \begin{bmatrix} \Omega^{-1} & 0 \\ 0 & (\Omega^{-1})^* \end{bmatrix} \begin{bmatrix} f_1 \\ -f_0^* \end{bmatrix} \right)^H \begin{bmatrix} R_0(m, n) \\ R_1^*(m, n) \end{bmatrix}$$

The above expressions for $\hat{s}_0(m,n)$ and $\hat{s}_1(m,n)$ describe the correlation form of the MMSE receiver for STS. As indicated in the above definitions, 2M correlations of length 2N are required in order to compute the vectors $R_0(m,n)$ and $R_1(m,n)$. The MMSE estimates of $\hat{s}_0(m,n)$ and $\hat{s}_1(m,n)$ are formed by computing the indicated inner products between the length-2M MMSE weighting vectors and the corresponding length-2M observation vectors.

The development of the filter implementation of the STTD receiver is straightforward. As above, let $g_0=\Omega^{-1}f_0$ and $g_1=\Omega^{-1}f_1$. Note that $\hat{s}_0(m,n)$ can be written as $$\hat{s}_0(m,n) = g_0^H R_0(m,n) + (g_1^H)^* R_1^*(m,n)$$

$$= \sum_{l=0}^{M-1} g_{0,l}^* \sum_{i=1}^{2N} r_{2nN+i+l} c_{2nN+i}^* w_{m,i}^0 +$$

$$\sum_{l=0}^{M-1} g_{1,l}^* \sum_{i=1}^{2N} r_{2nN+i+l}^* c_{2nN+i} w_{m,i}^1$$

$$= \sum_{i=1}^{2N} c_{2nN+i}^* w_{m,i}^0 \sum_{l=0}^{M-1} g_{0,l}^* r_{2nN+i+l} +$$

$$\sum_{i=1}^{2N} c_{2nN+i} w_{m,i}^1 \sum_{l=0}^{M-1} g_{1,l} r_{2nN+i+l}^*$$

$$= \sum_{i=1}^{2N} c_{2nN+i}^* w_{m,i}^0 (\tilde{g}_0 * r(2nN+i)) +$$

$$\left( \sum_{i=1}^{2N} c_{2nN+i}^* w_{m,i}^1 (\tilde{g}_1 * r(2nN+i)) \right)^*.$$

where $\tilde{g}_0$ and $\tilde{g}_1$ were defined previously. Similarly, we have $$\hat{s}_1(m,n) = g_1^H R_0(m,n) - (g_0^H)^* R_1^*(m,n)$$

$$= \sum_{l=0}^{M-1} g_{1,l}^* \sum_{i=1}^{2N} r_{2nN+i+l} c_{2nN+i}^* w_{m,i}^0 -$$

$$\sum_{l=0}^{M-1} g_{0,l} \sum_{i=1}^{2N} r_{2nN+i+l}^* c_{2nN+i} w_{m,i}^1$$

$$= \sum_{i=1}^{2N} c_{2nN+i}^* w_{m,i}^0 \sum_{l=0}^{M-1} g_{1,l}^* r_{2nN+i+l} -$$

$$\sum_{i=1}^{2N} c_{2nN+i} w_{m,i}^1 \sum_{l=0}^{M-1} g_{0,l} r_{2nN+i+l}^*$$

$$= \sum_{i=1}^{2N} c_{2nN+i}^* w_{m,i}^0 (\tilde{g}_1 * r(2nN+i)) -$$

$$\left( \sum_{i=1}^{2N} c_{2nN+i}^* w_{m,i}^1 (\tilde{g}_0 * r(2nN+i)) \right)^*.$$

Note that that the two symbol estimates $\hat{s}_0(m,n)$ and $\hat{s}_1(m,n)$ can be written entirely in terms of the convolutions $\tilde{g}_0 * r(\cdot)$ and $\tilde{g}_1 * r(\cdot)$. As with OTD, the convolution formulation is preferred because it greatly reduces the complexity associated with the demodulation of multiple Walsh code channels. The convolution implementation of the MMSE STTD receiver is illustrated in FIG. 6.

Adaptive MMSE Receivers for Open-Loop Transmit Diversity

The MMSE receiver can be implemented by estimating both the signal correlation matrix $\Gamma_Q$ and the channel impulse responses $f_0$ and $f_1$, and directly computing the MMSE solution using these estimates. The correlation matrix can be estimated directly as the time average $$\Gamma_Q \approx \sum_n Q(n) Q^H(n) = \sum_n \begin{bmatrix} R_0(n) \\ R_1^*(n) \end{bmatrix} \begin{bmatrix} R_0(n) \\ R_1^*(n) \end{bmatrix}^H,$$

where n is the symbol index. The channel impulse responses $f_0$ and $f_1$ can be estimated by correlating the received signal with the pilot signals transmitted on the first and second antenna, respectively, over a span of delays covering the delay-spread of the channel, and low-pass filtering the result.

Direct implementation of the MMSE solution for OTD, STTD or STS may not be feasible for reasons of computational complexity. Calculation of the time average of the sample correlation matrix requires $M(M-1)/2$ complex multiplications per symbol. Significant complexity is also associated with the projection of the mean vectors $\mu_Q(s_0)$ and $\mu_Q(s_1)$ onto the matrix inverse $(\Gamma_Q)^{-1}$. For this reason, an adaptive implementation of the MMSE receiver for each of these transmit diversity methods is highly desirable. Decision-directed adaptive implementations will not perform well, in general, due to the effect of error propagation on the adaptation algorithm. An adaptation algorithm that makes use of pilot signals will not suffer from error propagation.

Each of the standards that support transmit diversity provide a separate pilot signal for each of the diversity antennas. In these standards, an unmodulated Walsh code is transmitted over each of the diversity antennas. A pilot-based adaptive implementation of the MMSE receiver is only possible if the MMSE receiver for the pilot codes can be shown to be within a positive scaling factor of the MMSE receiver for the traffic channels.

Recall from the development of the MMSE receivers for OTD, STTD, and STS, that the MMSE receivers for symbols $s_0$ and $s_1$, except for a multiplicative constant, do not depend on the particular Walsh code used for the given traffic channel. Thus, irrespective of the number of traffic channels, only these two MMSE equalizers are required at the receiver. If the MMSE receiver for the pilot can be shown to yield these two equalizers, a pilot-based adaptive implementation of the MMSE receiver can be used.

For OTD, the MMSE receivers for symbols $s_0$ and $s_1$ are proportional to $\Omega^{-1}f_0$ and $\Omega^{-1}f_1$, respectively. Because the pilot signals are encoded in the same manner as the code symbols (i.e., one symbol per antenna and one pilot per antenna), the equalizers for the symbols $s_0$ and $s_1$ can clearly be adapted independently as in FIG. 4. Furthermore, in the absence of coding, there is no reason not to adapt the equalizers independently.

For OTD, the MMSE equalizers for subchannels $s_0$ and $s_1$ can be adapted either independently or jointly. Independent and joint adaptation of the OTD MMSE receiver are presented in FIGS. 4 and 5, respectively. As noted previously, the signal-to-noise ratios of the subchannels $s_0$ and $s_1$ will not in general be equal. As a result, the subchannels must in general be scaled separately at the input to the channel decoder. The per antenna pilots used for OTD can be used to separately adapt the MMSE receivers for the symbols $s_0$ and $s_1$, transmitted from the first and second antenna, respectively. For the independent adaptation method presented in FIG. 4, the subchannels $s_0$ and $s_1$ are weighted by the inverse of their respective measured mean-square errors.

Joint adaptation of the MMSE receivers for the two OTD subchannels $s_0$ and $s_1$ is illustrated in FIG. 5. The per antenna pilots used for OTD can be viewed as the encoding of a pilot symbol s, equal to 1, in the following sense. The pilot symbol s is transmitted over the first antenna using the first pilot code. Simultaneously, the pilot symbol s is also transmitted over the second antenna using the second pilot code. The pilot codes are assumed to be extended Walsh pilots of the form (w,−w) and (w,w), although the analysis can be easily extended to apply to any pair of orthogonal pilot codes. Let the vector $R_0$ denote the (length-M) vector of Rake finger outputs resulting from correlation of the received signal with the first pilot code. Let the vector $R_1$ denote the vector resulting from correlation of the received signal with the second pilot code. Let Q' denote the vertical concatenation of $R_0$ and $R_1$, and note that $$E(Q's^*) = E\left(\begin{bmatrix} R_0 \\ R_1 \end{bmatrix} s^*\right) = 2N\sqrt{P_0/2}\begin{bmatrix} f_0 \\ f_1 \end{bmatrix},$$

where $P_0$ is the total power allocated to the pilot. Note also that the covariance matrix $\Gamma_{Q'}$ is given by $$\Gamma_{Q'} = E\left\{\begin{bmatrix} R_0 R_0^H & R_0 R_1^H \\ R_1 R_0^H & R_1 R_1^H \end{bmatrix}\right\},$$

where $$E(R_0 R_0^H) = 2N\left(\sum_{j=1}^K P_i \alpha_i\right)\Psi^{0,0} + 2N\left(\sum_{j=1}^K P_i(1-\alpha_i)\right)\Psi^{1,1} + 2N^2 P_0 f_0 f_0^H + 2N I_{oc}\Phi,$$

$$E(R_1 R_1^H) = 2N\left(\sum_{j=1}^K P_i \alpha_i\right)\Psi^{0,0} + 2N\left(\sum_{j=1}^K P_i(1-\alpha_i)\right)\Psi^{1,1} + 2N^2 P_0 f_1 f_1^H + 2N I_{oc}\Phi,$$

and $$E(R_0 R_1^H) = 2N^2 P_0 f_0 f_1^H,$$
$$E(R_1 R_0^H) = 2N^2 P_0 f_1 f_0^H.$$

Thus, $$\frac{\Gamma_{Q'}}{2N I_{or}} = \begin{bmatrix} \Omega & 0 \\ 0 & \Omega \end{bmatrix} + \frac{NP_0}{I_{or}}\begin{bmatrix} f_0 \\ f_1 \end{bmatrix}\begin{bmatrix} f_0 \\ f_1 \end{bmatrix}^H.$$

The MMSE estimator for the pilot symbol s is thus proportional to $$\left(\frac{\Gamma_{Q'}}{2N I_{or}}\right)^{-1}\begin{bmatrix} f_0 \\ f_1 \end{bmatrix} =$$

$$\left(\begin{bmatrix} \Omega & 0 \\ 0 & \Omega \end{bmatrix} + \frac{NP_0}{I_{or}}\begin{bmatrix} f_0 \\ f_1 \end{bmatrix}\begin{bmatrix} f_0 \\ f_1 \end{bmatrix}^H\right)^{-1}\begin{bmatrix} f_0 \\ f_1 \end{bmatrix} \propto \begin{bmatrix} \Omega & 0 \\ 0 & \Omega \end{bmatrix}^{-1}\begin{bmatrix} f_0 \\ f_1 \end{bmatrix} = \begin{bmatrix} \Omega^{-1} f_0 \\ \Omega^{-1} f_1 \end{bmatrix}.$$

Since the MMSE receivers for $s_0$ and $s_1$ were previously shown to be of the form $\alpha_0 \Omega^{-1} f_0$ and $\alpha_1 \Omega^{-1} f_1$, for arbitrary positive, real constants $\alpha_0$ and $\alpha_1$, this completes the proof that joint adaptation yields MMSE receivers for the two subchannels. In order for the channel decoder to perform optimally, the two subchannels must be scaled appropriately at the input to the channel decoder. For joint adaptation of the MMSE receiver, the optimal scaling scaling factor for the two subchannels is the inverse of the measured mean-square error of the joint pilot estimate. The optimal scaling is illustrated in FIG. 5.

This completes the proof that the joint MMSE estimator for s will yield appropriately scaled MMSE estimators for the subchannels $s_0$ and $s_1$.

For both STTD and STS, the MMSE receiver for symbols of type $s_0$ is proportional to $$\begin{bmatrix} \Omega^{-1} f_0 \\ (\Omega^{-1})^* f_1^* \end{bmatrix}.$$

It will now be shown that this MMSE estimator is the same as the MMSE estimator for a symbol transmitted using the per antenna pilot codes. Assume that a pilot symbol s (=1) is transmitted over the first antenna using the first pilot code. Simultaneously, the symbol s* is transmitted over the second antenna using the second pilot code. The pilot codes are assumed to be extended Walsh pilots of the form (w,−w) and (w,w), although the analysis can be easily extended to apply to any pair of orthogonal pilot codes. Let the vector $R_0$ denote the (length-M) vector of Rake finger outputs resulting from correlation of the received signal with the first pilot code. Let the vector $R_1$ denote the vector resulting from correlation of the received signal with the second pilot code. Let Q denote the vertical concatenation of $R_0$ and $R_1$ and note that $$E(Qs^*) = E\left(\begin{bmatrix} R_0 \\ R_1^* \end{bmatrix} s^*\right) = 2N\sqrt{P_0/2}\begin{bmatrix} f_0 \\ f_1^* \end{bmatrix},$$

where $P_0$ is the total power allocated to the pilot. Note also that the covariance matrix $\Gamma_Q$ is given by $$\Gamma_Q = E\left\{\begin{bmatrix} R_0 R_0^H & R_0 R_1^T \\ R_1^* R_0^H & R_1^* R_1^T \end{bmatrix}\right\}.$$

where $$E(R_0 R_0^H) = 2N\left(\sum_{j=1}^K P_i \alpha_i\right)\Psi^{0,0} + 2N\left(\sum_{j=1}^K P_i(1-\alpha_i)\right)\Psi^{1,1} + 2N^2 P_0 f_0 f_0^H + 2N I_{oc}\Phi,$$

$$E(R_1 R_1^H) = 2N\left(\sum_{j=1}^K P_i \alpha_i\right)\Psi^{0,0} + 2N\left(\sum_{j=1}^K P_i(1-\alpha_i)\right)\Psi^{1,1} + 2N^2 P_0 f_1 f_1^H + 2N I_{oc}\Phi,$$

and $$E(R_0 R_1^T) = 2N^2 P_0 f_0 f_1^T,$$
$$E(R_1^* R_0^H) = 2N^2 P_0 f_1^* f_0^H.$$

Thus, $$\frac{\Gamma_Q}{N I_{or}} = \begin{bmatrix} \Omega & 0 \\ 0 & \Omega^* \end{bmatrix} + \frac{NP_0}{I_{or}}\begin{bmatrix} f_0 \\ f_1^* \end{bmatrix}\begin{bmatrix} f_0 \\ f_1^* \end{bmatrix}^H.$$

The MMSE estimator for s is thus proportional to $$\left(\frac{\Gamma_Q}{N I_{or}}\right)^{-1}\begin{bmatrix} f_0 \\ f_1^* \end{bmatrix} =$$

$$\left(\begin{bmatrix} \Omega & 0 \\ 0 & \Omega^* \end{bmatrix} + \frac{NP_0}{I_{or}}\begin{bmatrix} f_0 \\ f_1^* \end{bmatrix}\begin{bmatrix} f_0 \\ f_1^* \end{bmatrix}^H\right)^{-1}\begin{bmatrix} f_0 \\ f_1^* \end{bmatrix} \propto \begin{bmatrix} \Omega & 0 \\ 0 & \Omega^* \end{bmatrix}^{-1}\begin{bmatrix} f_0 \\ f_1^* \end{bmatrix} = \begin{bmatrix} \Omega^{-1} f_0 \\ \Omega^{-1} f_1^* \end{bmatrix}.$$

Therefore the MMSE receiver for the pilot symbol s is the same as the MMSE receiver for channel $s_0$. The MMSE receiver for $s_0$ directly provides the MMSE estimator for $s_1$.

MMSE Receiver

The MMSE receiver developed above does not depend upon the particular code channel. Thus the MMSE receiver for the pilot symbols is the same as the MMSE receiver for the transmitted data (i.e., traffic channel data). Since the pilot symbols are known at the receiver, the error of the pilot symbol estimate can be measured and used to adaptively update and improve the MMSE receiver for the pilot symbols. The resulting MMSE receiver is then also used to demodulate the traffic channel data. In a preferred embodiment of the present invention, an MMSE receiver determines a proper weighting vector by adaptively minimizing the mean-square error of the pilot symbol estimates (or equivalently, maximizing the signal-to-noise ratio), and then applying this weighting vector to traffic channel data.

Figure 2:
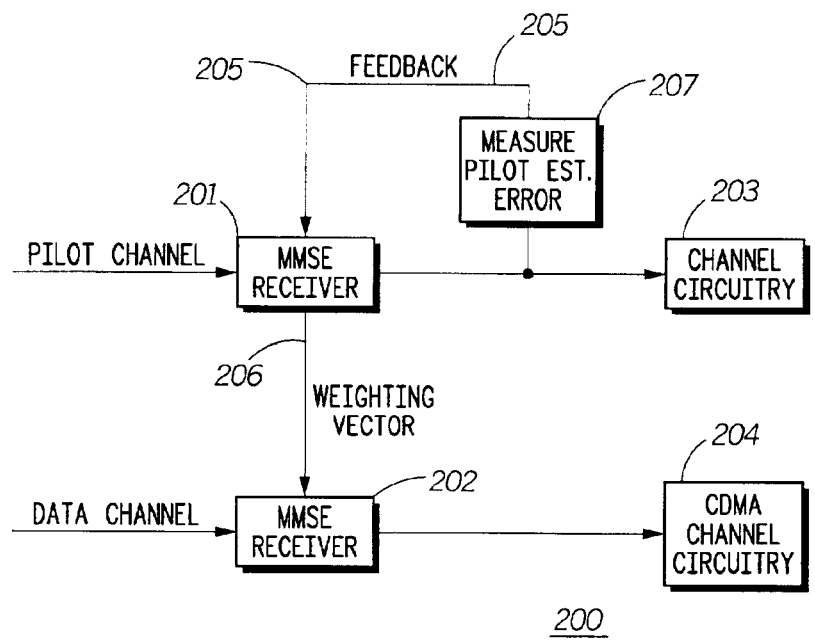
FIG. 2 is a block diagram of an MMSE receiver in accordance with a preferred embodiment of the present invention.

FIG. 2 is a block diagram of receiver 200 in accordance with a preferred embodiment of the present invention. For illustration purposes receiver 200 is shown with two MMSE receivers 201 and 202, one of ordinary skill in the art will recognize that receiver 200 may employ a single MMSE receiver having both the pilot-code despread and data-code despread vectors as inputs. As shown, receiver 200 comprises first MMSE receiver 201 having a pilot input, second MMSE receiver 202 having a second channel input, channel circuitry 203, channel circuitry 204, and pilot error measuring circuitry 207.

Operation of receiver 200 in accordance with the preferred embodiment of the present invention occurs as follows. The pilot signal (pilot-code despread input vectors) enters MMSE receiver 201 and a second signal (data-code despread input vectors) enters MMSE receiver 202. MMSE receiver 201 performs a channel estimate for the received pilot signal, determines a mean-square error of the pilot signal, and operates to minimize the mean-square error of the pilot estimate by constantly updating a weighting vector. In particular, the pilot estimation error (measured by circuitry 207) is fed back into MMSE receiver 201 (via feedback 205) and is used to update the weighting vector applied to the pilot channel by MMSE receiver 201. An estimate of the pilot channel exits MMSE receiver 201. The MMSE weighting vector 206 is also fed into MMSE receiver 202 and is applied to the second channel (i.e., the stream of data-code despread vectors). Symbol estimates (or in other embodiments, chip estimates) exit the MMSE receiver 202 and enter channel circuitry 204, where normal channel processing occurs.

As described above, since the pilot channel data is known, the MMSE receiver for the pilot channel data can be updated using the measured error of the pilot estimate. However, because the MMSE receiver is the same for both the pilot and data channels, the MMSE receiver for the pilot can be used to demodulate the data channel, and this receiver will yield minimum mean-square error estimates of the data channel symbols.

Figure 3:
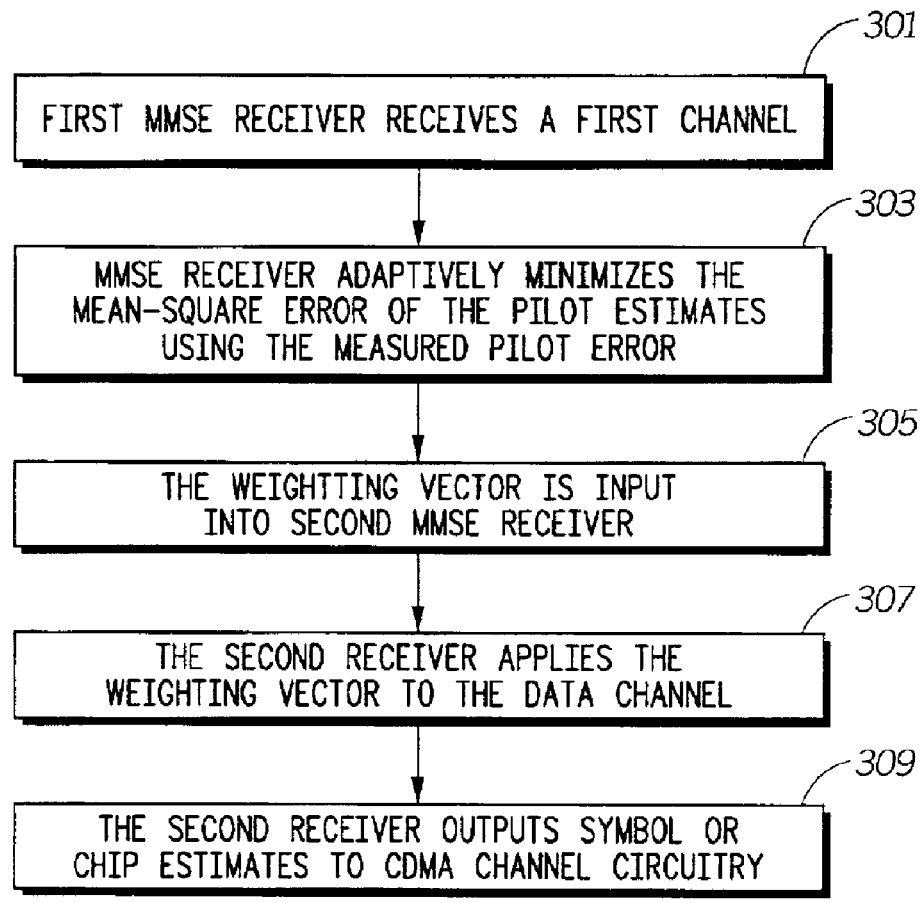
FIG. 3 is a flow chart illustrating the operation of the receiver of FIG. 2 in accordance with the preferred embodiment of the present invention.

FIG. 3 is a flow chart illustrating the operation of receiver 200 in accordance with the preferred embodiment of the present invention. As discussed above, for illustration purposes, receiver 200 is shown with two MMSE receivers 201 and 202. However, one of ordinary skill in the art will recognize that receiver 200 may employ a single MMSE receiver having both the pilot-code despread and data-code despread vectors as inputs.

The logic flow begins at step 301 where first MMSE receiver 201 receives a first channel. In the preferred embodiment the first channel is a pilot channel, however in alternate embodiment the first channel may be any other CDMA channel (e.g., a first data channel, a sync channel, ... etc). At step 303 MMSE receiver 201 adaptively minimizes the mean-square error of the pilot estimates by varying a weighting or combining vector in to minimize the measured pilot error signal. At step 305 weighting vector 206 is input into second MMSE receiver 202. Receiver 202 applies the weighting vector 206 to the data channel (step 307) and outputs symbol or chip estimates to CDMA channel circuitry 204 (step 309).

FIG. 4 and FIG. 5 illustrate adaptive implementations of the MMSE receiver for OTD modulation. Note that the MMSE OTD receiver employs separate equalizers for the two subchannels, $s_0$ and $s_1$. Separate adaptation of the subchannel equalizers is shown in FIG. 4, while joint adaptation is shown in FIG. 5.

FIG. 4 is a block diagram of receiver 400 for receiving an OTD signal in accordance with a first embodiment of the present invention. In accordance with the first embodiment, a separate adaptation technique is used for the two subchannels $s_0$ and $s_1$. In systems employing OTD, a separate pilot channel (code) is allocated to each of the two transmit antenna. Recall that in OTD, separate MMSE receivers are required for symbols $s_0$ transmitted from the first antenna and symbols $s_1$ transmitted from the second antenna. For the separate adaptation technique, separate estimates are formed for the symbols transmitted over the first and second pilot channels. The pilot estimate errors for the first pilot channel are used to update and improve the MMSE receiver for subchannel $s_0$. Similarly, the pilot estimate errors for the second pilot channel are used to update and improve the MMSE receiver for subchannel $s_1$. Note that the standard methods for adapting the MMSE receiver include both least-mean squares adaptation (LMS) and recursive least-squares adaptation (RLS).

As shown in FIG. 4, the received CDMA signal (containing both data and pilot channel streams) is fed into two MMSE receivers (receivers 401 and 402). Within a CDMA communication system all base station transmissions commonly occur simultaneously within the same frequency band. Therefore, the signal received by the subscriber comprises a multiplicity of frequency and time overlapping coded transmissions from one or more base stations to the subscriber units. Each of these signals is transmitted simultaneously at the same radio frequency (RF) and is distinguishable only by its specific spreading and encoding (channel). In other words, the signal received at a base-station or remote unit receiver is a composite signal and an individual signal is distinguishable only after decoding.

For OTD, symbols of type $s_0$ are transmitted over the first antenna using the extended code (w,−w), and the symbols of type $s_1$ are transmitted over the second antenna using the extended code (w,w). MMSE receiver 401 serves to minimize the mean-square error for symbol estimates of symbols spread with extended code (w,−w), while MMSE receiver 402 serves to minimize the mean-square error for symbol estimates of symbols spread with extended code (w,w). In other words MMSE receivers 401–402 serve to minimize the mean-square errors $$<\|\hat{s}_0 - s_0\|^2> \text{ and } <\|\hat{s}_1 - s_1\|^2>$$

(<·> denotes the expected value)over all estimators $v_0$ and $v_1$ for $\hat{s}_0$ and $\hat{s}_1$ of the form $$\hat{s}_0 = v_0^H R_0 \quad \hat{s}_1 = v_1^H R_1,$$

where $R_0$ and $R_1$ were defined for OTD previously.

After long code despreading via despreaders 405 and 406, the resulting despread signals are further despread via Walsh despreaders 407–410. The error signal for the pilot channel is determined with summers 411 and 412 by subtracting the known pilot signal (string of 1's) from the pilot estimate. The error is fed back through feedback signals 403 and 404 to MMSE receivers 401 and 402, respectively. In the preferred embodiment of the present invention, the feedback signal is used to update and improve the weighting vector 206, and weighting vector 206 is used to optimally demodulate the data channel as described in FIG. 2. Typical methods for updating the receiver (equivalently, weighting vector, combining vector) include both least mean-squares (LMS) and recursive least-squares (RLS) adaptation.

It should be noted that MMSE receivers 401 and 402 each receive both the pilot and data channels. The MMSE weighting vector for the data channel symbols is determined by adaptively minimizing the mean-square error of the pilot symbol estimates. The resulting MMSE weighting vector is then used to demodulate the data channel symbols.

FIG. 5 shows an MMSE receiver for receiving an OTD signal in accordance with a second embodiment. In accordance with the second embodiment, a joint adaptation method is used. Joint adaptation of MMSE receivers for subchannels $s_0$ and $s_1$ is possible because the same sequence of pilot symbols (a sequence of 1's) is transmitted from the two transmit antennas. Note, however, that the pilot symbols are spread with the same long spreading code, but with different Walsh codes. For joint adaptation, the pilot estimates for the first and second pilot channels are summed together to form a single joint pilot estimate. The measured error from this sum pilot estimate is then used to adaptively update and improve the receivers (equivalently, the weighting vector or combining vector) for both subchannels $s_0$ and $s_1$. Typically, the LMS or RLS adaptation algorithms would be used to update the receivers for the two subchannels using the measured error for the joint pilot estimate.

MMSE receivers 501 and 502 receive an input signal containing the pilot channel and data channels. The MMSE receivers 501–502 serve to minimize the mean-square errors $$<\|\hat{s}_0-s_0\|^2> \text{ and } <\|\hat{s}_1-s_1\|^2>$$

(<·> denotes the expected value)over all estimators $v_0$ and $v_1$ for $\hat{s}_0$ and $\hat{s}_1$ of the form $$\hat{s}_0 = v_0^H R_0 \quad \hat{s}_1 = v_1^H R_1,$$

where $R_0$ and $R_1$ were defined for OTD previously. Thus, the MMSE receivers 501–502 are the same as the MMSE receiver 401–402 in FIG. 4. The only difference between the receivers in FIGS. 4 and 5 is the adaptation method used to update the MMSE receivers for subchannels $s_0$ and $s_1$.

The output of the MMSE receivers 501 and 502 are long-code despread by despreaders 503 and 504, respectively. The output from each despreaders 503 and 504 are then Walsh despread by despreaders 505–508. A joint pilot estimate is formed by summing the pilot estimates for the first and second pilot channels. An error signal generated by subtracting the known pilot signal from this joint pilot estimate at summer 509. The error signal is then fed back (feedback 510) to the MMSE receivers 501–502 to update and improve the weighting vector for the pilot channel (typically using LMS or RLS adapation). The weighting vector for the first and second pilot channels are then used by receivers 501–502 to receive (demodulate) the data on subchannels $s_0$ and $s_1$, respectively.

FIG. 6 shows the MMSE receiver 600 for receiving an STTD signal. Both STTD and STS partition the encoded and interleaved symbols into pairs of symbols, $s_0$ and $s_1$. With STTD, the symbol pair is transmitted over two time slots using a single Walsh code. MMSE receivers 601–602 serve to minimize The MMSE receivers 601–602 serve to minimize the mean-square errors $$<\|\hat{s}_0-s_0\|^2> \text{ and } <\|\hat{s}_1-s_1\|^2>$$

(<·> denotes the expected value)over all estimators $v_0$ and $v_1$ for $\hat{s}_0$ and $\hat{s}_1$ of the form $$\hat{s}_0 = v_0^H \begin{bmatrix} R_0 \\ R_1^* \end{bmatrix} \hat{s}_1 = v_1^H \begin{bmatrix} R_0 \\ R_1^* \end{bmatrix},$$

where $R_0$ and $R_1$ were defined for STTD previously.

As shown in FIG. 6, MMSE receivers 601 and 602 receive a CDMA signal. After long code despreading via despreaders 603–604 the resulting signals are sent to Walsh and pilot despreaders 605–608. After appropriate despreading, a pilot estimate is formed (via summer 609) and the pilot estimation error is measured at summer 610. As discussed previously, the pilot error can be measured because the pilot signal is known a priori at the receiver. The pilot estimation error is fed back to MMSE receivers 601–602 via feedback 611, and is used to adaptively update and improve the receivers 601–602 (typically using LMS or RLS adaptation). Optimal estimates of symbols $\hat{s}_0$ and $\hat{s}_1$ are obtained by applying the MMSE receivers 601–602 to the traffic channel data.

Figure 7:
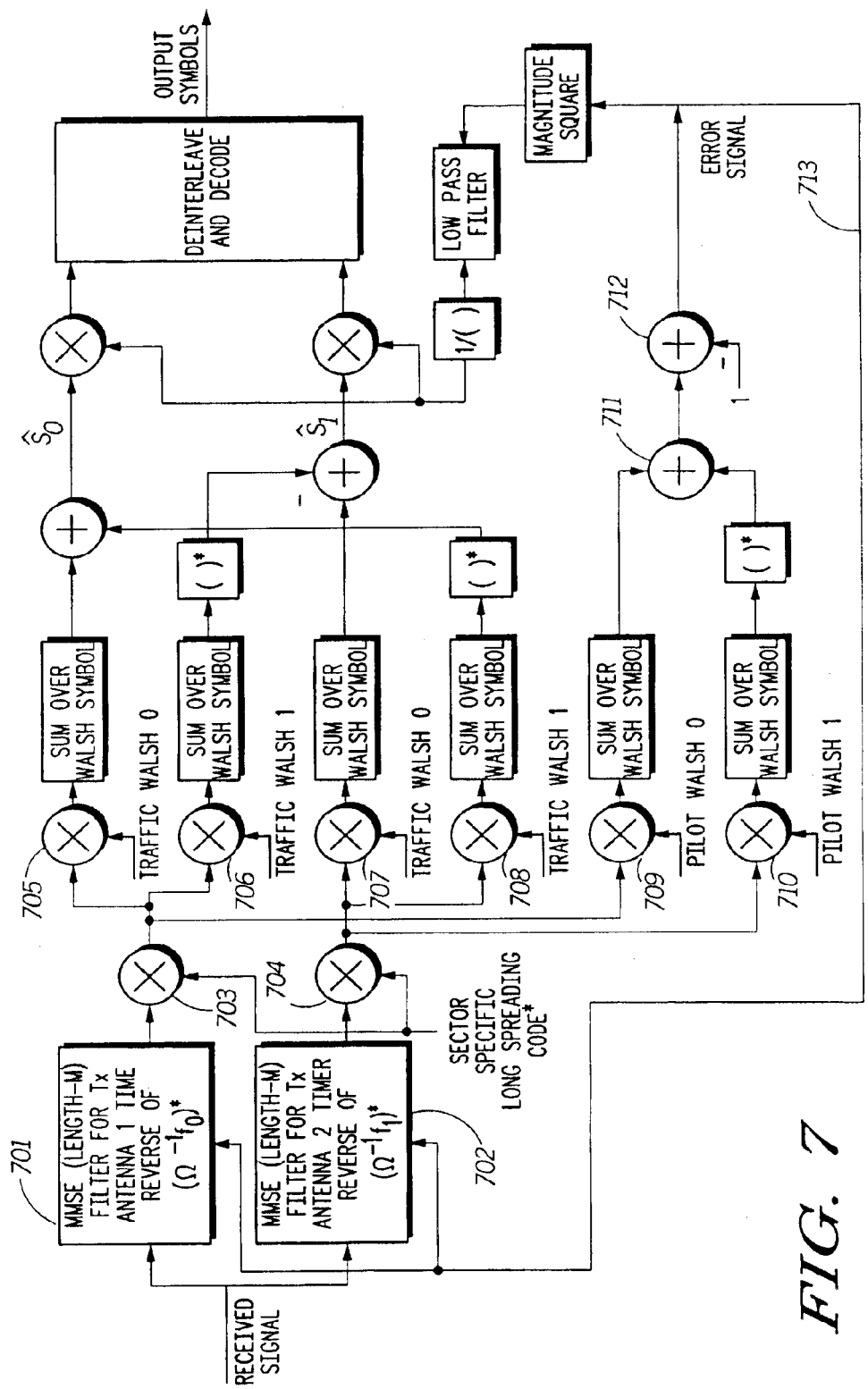

FIG. 7 shows MMSE 700 receiver for receiving an STS signal. Both STTD and STS partition the encoded and interleaved symbols into pairs of symbols, $s_0$ and $s_1$. With STS, the symbol pair is transmitted over a single time slot using two Walsh codes. The mappings used for STS are indicated in Table 1.

As shown in FIG. 7, MMSE receivers 701 and 702 receive a CDMA signal. The MMSE receivers 701–702 serve to minimize the mean-square errors $$<\|\hat{s}_0-s_0\|^2> \text{ and } <\|\hat{s}_1-s_1\|^2>$$

(<·> denotes the expected value)over all estimators $v_0$ and $v_1$ for $\hat{s}_0$ and $\hat{s}_1$ of the form $$\hat{s}_0 = v_0^H \begin{bmatrix} R_0 \\ R_1^* \end{bmatrix} \hat{s}_1 = v_1^H \begin{bmatrix} R_0 \\ R_1^* \end{bmatrix},$$

where $R_0$ and $R_1$ were defined for STS previously.

After long code despreading via despreaders 703–704 the resulting signals are sent to Walsh and pilot despreaders 705–710. After appropriate despreading, a pilot estimate is formed (via summer 711), and the pilot estimation error is measured at 712. As discussed previously, the pilot error can be measured because the pilot signal is known a priori at the receiver. The pilot estimation error is then fed back to MMSE receivers 701–702 via feedback 713, and is used to adaptively update and improve the receivers 701–702 (typically using LMS or RLS adaptation algorithms). Optimal estimates of symbols $\hat{s}_0$ and $\hat{s}_1$ are obtained by applying the MMSE receivers 701–702 to the traffic channel data.

In an alternate embodiment of the present invention the MMSE receivers for OTD, STTD, and STS may not be implemented adaptively as described in FIG. 4 through FIG. 7. Instead, the MMSE receiver may be computed directly from estimates of the previously defined propagation chan nels $f_0$ and $f_1$, and the previously defined correlation matrix, $\Gamma_Q$, given by $$\Gamma_Q = E(QQ^H) = E\left\{\begin{bmatrix} R_0 R_0^H & R_0 R_1^T \\ R_1^* R_0^H & R_1^* R_1^T \end{bmatrix}\right\}.$$

Figure 8:
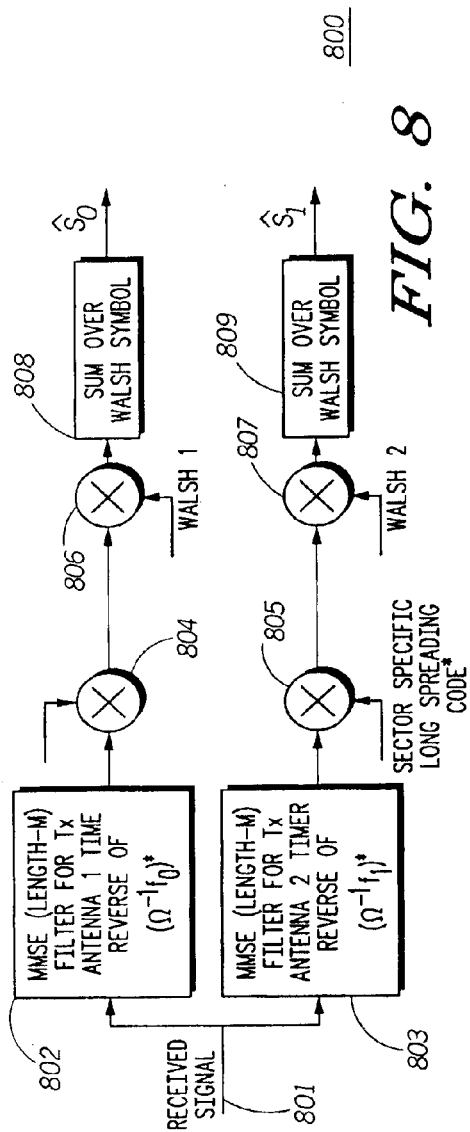
Figure 9:
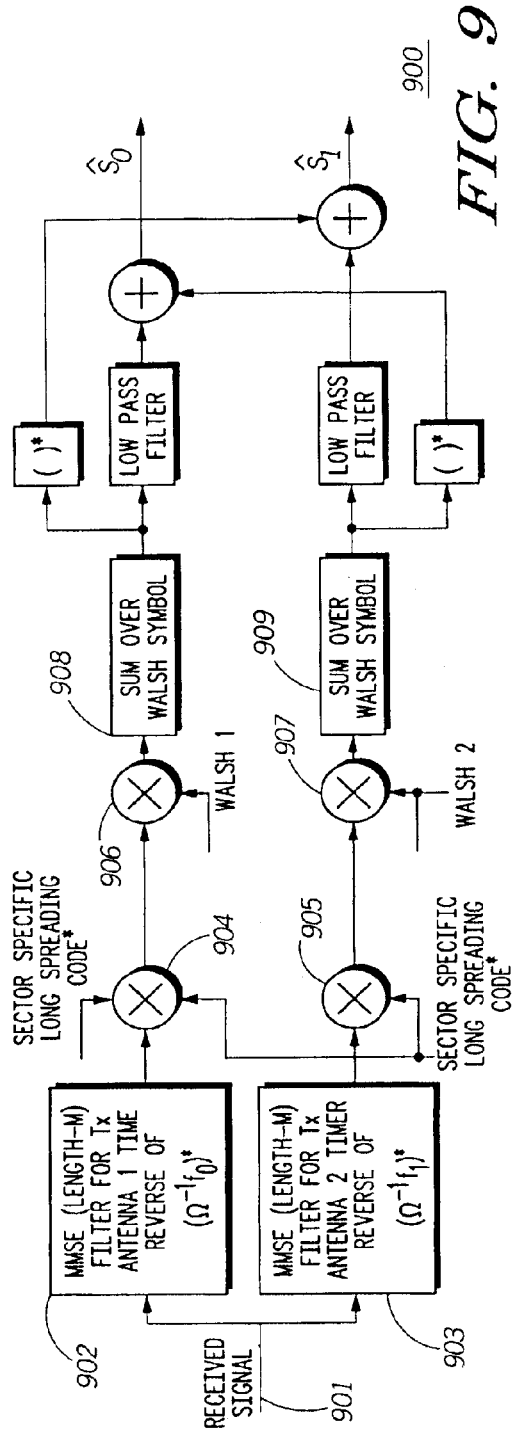
Figure 10:
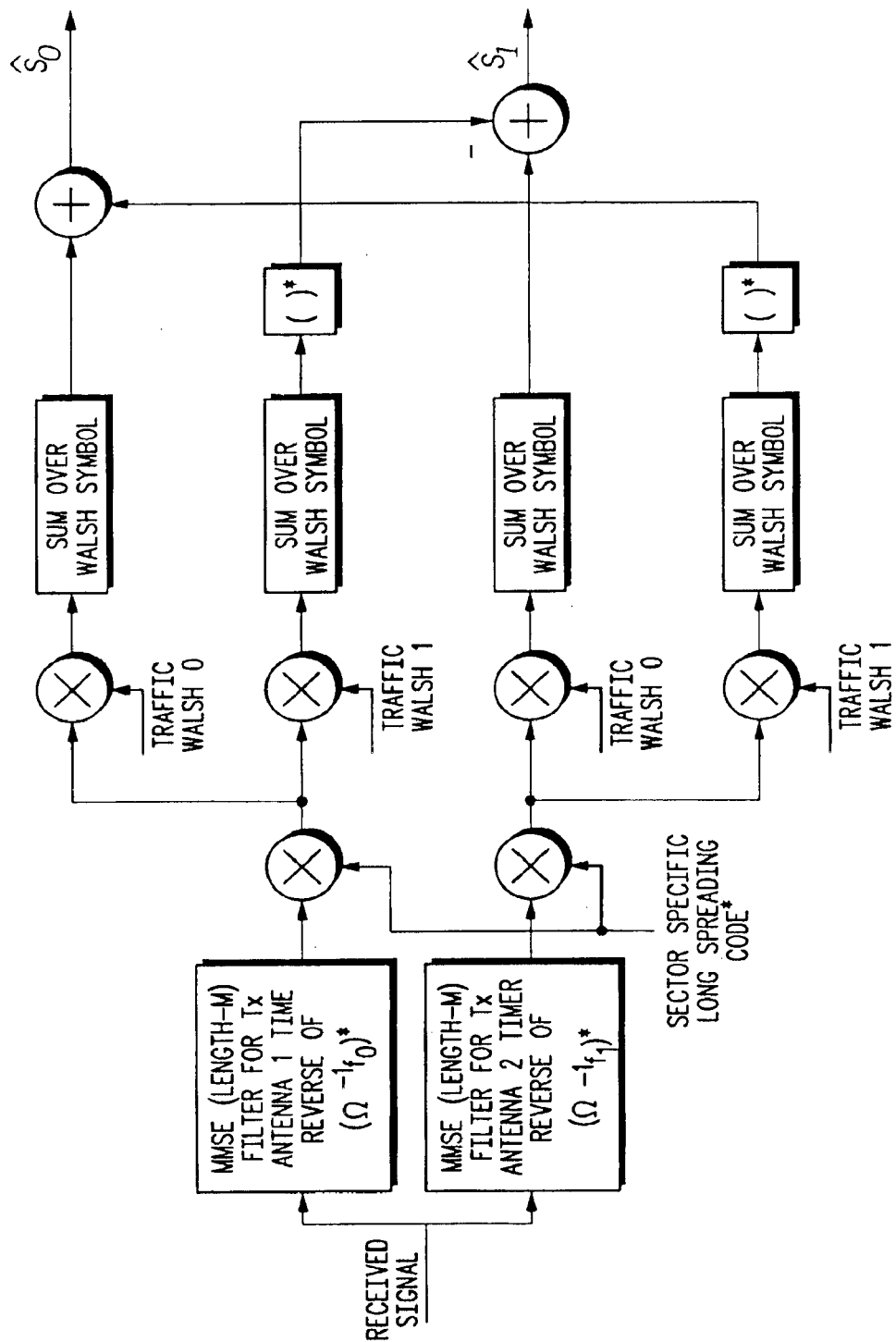

This implementation is shown in FIGS. 8–10. As described previously, both the propagation channels $f_0$ and $f_1$, and the previously defined correlation matrix, $\Gamma_Q$, can be estimated using the per antenna pilot signals. Direct computation of the MMSE receiver will in general be more computationally intensive than an adaptive implementation. However, direct computation of the MMSE solution should enable the MMSE receiver to perform better than the adaptive implementation in rapidly fading environments. In the FIGS. 4–7, the pilot was utilized to adaptively update the MMSE receiver and to compute the optimal weighting of the symbol estimates ($\hat{s}_0$ and $\hat{s}_1$) at the input to the decoder. The weighting of the symbols prior to the decoder is in general necessary for two reasons:

Firstly, for OTD, the two symbols $\hat{s}_0$ and $\hat{s}_1$ have unequal signal-to-noise ratios (SNR's). The decoder must have knowledge of this information in order to decode optimally. For STS and STTD, the signal-to-noise ratio of the two estimates s0hat and s1hat are always equal. Thus the weighting of these two symbols will always be the same. No weighting function is required for STS or STTD if the channel is not time varying.

Secondly, for time-varying channels, the signal-to-noise ratios of the estimates $\hat{s}_0$ and $\hat{s}_1$ will vary over time (for OTD, STS, STTD). Optimal decoding requires that the decoder have knowledge of this information (the decoder weighs symbols with higher signal-to-noise ratios more heavily). Thus, some weighting function must always be applied to the symbol estimates $\hat{s}_0$ and $\hat{s}_1$ when the channel is time varying (for OTD and STS and STTD).

As shown in FIG. 8, signal 801 enters two MMSE receivers (802 and 803). The MMSE receivers serve to minimize the mean-square error as discussed above, without using the weighting vector derived from the pilot signal. The resulting channel estimations are then despread with sector specific long codes and Walsh codes (via despreaders 804–806). The resulting signals are summed (808–809) to produce estimates $\hat{s}_0$ and $\hat{s}_1$. Similar receivers are shown for STTD diversity and STS diversity in FIG. 9 and FIG. 10, respectively.

While the invention has been particularly shown and described with reference to a particular embodiment, it will be understood by those skilled in the art that various changes in form and details may be made therein without departing from the spirit and scope of the invention. It is intended that all such changes come within the scope of the following claims:

What is claimed is:

1. In a linear minimum mean-square error receiver, a method of providing optimal linear estimates of a plurality of symbol substreams comprising:

computing a first observation vector, $R_{0,1}$, by correlating a set of delayed versions of a received signal with a long spreading code and a first walsh code;

computing a second observation vector, $R_{1,1}$, by correlating the set of delayed versions of the received signal with the long spreading code and a second walsh code;

computing a first inner product of a vertical concatenation of the first and second observation vectors with a first receiver vector to produce a first symbol estimate; and computing a second inner product of the vertical concatenation of the first and second observation vectors with a second receiver vector to produce a second symbol estimate.

2. The method of claim 1 wherein computation of the first receiver vector comprises:

computing a correlation matrix $\Gamma_Q$ defined by $$\Gamma_Q = E\left\{\begin{bmatrix} R_0 R_0^H & R_0 R_1^T \\ R_1^* R_0^H & R_1^* R_1^T \end{bmatrix}\right\};$$

and computing a product of an inverse of the correlation matrix and a vertical concatenation of two channel vectors, $f_0$ and $f_1^*$, to yield $$v_{\text{MMSE\_s}_0} = \frac{\Gamma^{-1}}{NI_{or}} \propto \begin{bmatrix} \Omega^{-1} & 0 \\ 0 & (\Omega^{-1})^* \end{bmatrix} \begin{bmatrix} f_0 \\ f_1^* \end{bmatrix}$$

wherein N denotes the length of this code, $I_{or}$ denotes the power per chip received from the serving base station, $\Omega$ denotes the normalized covariance matrix for both $R_0$ and $R_1$, E is the evaluation of the mean and covariance of the observation vectors $R_0$ and $R_1$.

3. The method of claim 1 wherein computation of the second receiver vector comprises:

computing a correlation matrix, $\Gamma_Q$, defined by $$v_{\text{MMSE\_s}_0} = \frac{\Gamma^{-1}}{NI_{or}} \propto \begin{bmatrix} \Omega^{-1} & 0 \\ 0 & (\Omega^{-1})^* \end{bmatrix} \begin{bmatrix} f_0 \\ f_1^* \end{bmatrix}$$

and computing a product of an inverse of the correlation matrix and a vertical concatenation of two channel vectors $f_1$ and $f_0^*$ to yield $$v_{\text{MMSE\_s}_0} = \frac{\Gamma^{-1}}{NI_{or}} \propto \begin{bmatrix} \Omega^{-1} & 0 \\ 0 & (\Omega^{-1})^* \end{bmatrix} \begin{bmatrix} f_1 \\ -f_0^* \end{bmatrix}$$

wherein N denotes the length of this code, $I_{or}$ denotes the power per chip received from the serving base station, $\Omega$ denotes the normalized covariance matrix for both $R_0$ and $R_1$, E is the evaluation of the mean and covariance of the observation vectors $R_0$ and $R_1$.

4. The method of claim 1 wherein the first observation vector is defined by $$R_{0,i} = \sum_{i=1}^{N} r_{i+1} c_i^* w_i,$$

wherein c is the long spreading code, w is the walsh code, r is the received signal, N is a number of chips per walsh code and l is an index within the first observation vector.

5. The method of claim 1 wherein the second observation vector is defined by $$R_{1,i} = \sum_{i=1}^{N} r_{N+i+1} c^*_{N+i} w_i,$$

wherein c is the long spreading code, w is the walsh code, r is the received signal, N is a number of chips per walsh code and l is an index within the second observation vector.

6. The method of claim 1 wherein the first observation vector is defined by $$R_{0,i} = \sum_{i=1}^{2,N} r_{i+1} c^*_i w^0_i = \sum_{i=1}^{N} r_{i+1} c^*_i w_i - \sum_{i=1}^{N} r_{N+i+1} c^*_{N+i} w_i,$$

wherein c is the long spreading code, $w^0$ is a first extended walsh code, w is the walsh code, r is the received signal, N is a number of chips per walsh code and l is an index within the first observation vector.

7. The method of claim 1 wherein the second observation vector is defined by $$R_{1,i} = \sum_{i=1}^{2,N} r_{i+1} c^*_i w^1_i = \sum_{i=1}^{N} r_{i+1} c^*_i w_i - \sum_{i=1}^{N} r_{N+i+1} c^*_{N+i} w_i,$$

wherein c is the long spreading code, $w^1$ is a second extended walsh code, w is the walsh code, r is the received signal, N is a number of chips per walsh code and l is an index within the second observation vector.

8. In a linear minimum mean-square error receiver, a method of providing optimal linear estimates of a plurality of symbol substreams comprising:

filtering a received signal with a time reverse of an upper component, $\Omega^{-1} f_0$, of a receiver vector, $$v_{\text{MMSE}\_s0} = \frac{\Gamma^{-1}}{N I_{or}} \propto \begin{bmatrix} \Omega^{-1} & 0 \\ 0 & (\Omega^{-1})^* \end{bmatrix} \begin{bmatrix} f_0 \\ f_1^* \end{bmatrix} = \begin{bmatrix} \Omega^{-1} f_0 \\ (\Omega^{-1})^* f_1^* \end{bmatrix}$$

to yield a first output;

filtering the received signal with a time reverse of a lower component, $(\Omega^{-1})^* f_1^*$, of the receiver vector, $$v_{\text{MMSE}\_s0} = \frac{\Gamma^{-1}}{N I_{or}} \propto \begin{bmatrix} \Omega^{-1} & 0 \\ 0 & (\Omega^{-1})^* \end{bmatrix} \begin{bmatrix} f_0 \\ f_1^* \end{bmatrix} = \begin{bmatrix} \Omega^{-1} f_0 \\ (\Omega^{-1})^* f_1^* \end{bmatrix}$$

to yield a second output wherein $f_0$ and $f_1$ are two channel vectors, N denotes the length of this code, $1_{or}$ denotes the power per chip received from the serving base station, $\Omega$ denotes the normalized covariance matrix for both $R_0$ and $R_1$, E is the evaluation of the mean and covariance of the observation vectors $R_0$ and $R_1$, $\Gamma_Q$ denotes the correlation matrix correlating the first output with a product of a complex conjugate of a long spreading code and a first extended walsh code to yield a third output;

correlating the first output with a product of the complex conjugate of the long spreading code and a second extended walsh code to yield a fourth output;

correlating the second output with the product of the complex conjugate of the long spreading code and the first extended walsh code to yield a fifth output;

correlating the second output with the product of the complex conjugate of the long spreading code and the second extended walsh code to yield a sixth output;

summing the third output and a complex conjugate of the sixth output to yield a first symbol estimate; and subtracting a complex conjugate of the fourth output from the fifth output to yield a second symbol estimate.

9. The method of claim 8 further comprising:

correlating the first output with a product of the complex conjugate of the long spreading code and a first pilot walsh to yield a seventh output;

correlating the second output with a product of the complex conjugate of the long spreading code and a second pilot walsh to yield an eigth output;

summing the seventh output and complex conjugate of the eigth output to yield a ninth output;

subtracting 1 from the ninth output to yield an error measure.

10. The method of claim 9 further comprising using the error measure to adapt an estimate of the upper and lower components of the receiver vector.

11. The method of claim 9 further comprising:

computing a magnitude square of the error measure;

low pass filtering the magnitude square of the error measure;

computing an inverse of the filtered magnitude square of the error measure; and providing the computed inverse to a soft decision decoder as a measure of reliability.

12. In a linear minimum mean-square error receiver, a method of providing optimal linear estimates of a plurality of symbol substreams comprising:

filtering a received signal with a time reverse of an upper component, $\Omega^{-1} f_0$, of a receiver vector, $$v_{\text{MMSE}\_s0} = \frac{\Gamma^{-1}}{N I_{or}} \propto \begin{bmatrix} \Omega^{-1} & 0 \\ 0 & (\Omega^{-1})^* \end{bmatrix} \begin{bmatrix} f_0 \\ f_1^* \end{bmatrix} = \begin{bmatrix} \Omega^{-1} f_0 \\ (\Omega^{-1})^* f_1^* \end{bmatrix}$$

to produce a first output filtering the received signal with a time reverse of a lower component, $(\Omega^{-1})^* f_1^*$, of the receiver vector, $$v_{\text{MMSE}\_s0} = \frac{\Gamma^{-1}}{N I_{or}} \propto \begin{bmatrix} \Omega^{-1} & 0 \\ 0 & (\Omega^{-1})^* \end{bmatrix} \begin{bmatrix} f_0 \\ f_1^* \end{bmatrix} = \begin{bmatrix} \Omega^{-1} f_0 \\ (\Omega^{-1})^* f_1^* \end{bmatrix}$$

to produce a second output wherein $f_0$ and $f_1$ are two channel vectors, N denotes the length of this code, $1_{or}$ denotes the power per chip received from the serving base station, $\Omega$ denotes the normalized covariance matrix for both $R_0$ and $R_1$, E is the evaluation of the mean and covariance of the observation vectors $R_0$ and $R_1$, $\Gamma_Q$ denotes the correlation matrix correlating the first output with a product of a complex conjugate of a long spreading code and a walsh code to yield a first output sequence;

correlating the second output with the product of the complex conjugate of the long spreading code and the walsh code to yield a second output sequence;

summing a complex conjugate of a current output of the second output sequence with a previous output of the first output sequence to yield a first symbol estimate; and subtracting a complex conjugate of a current output of the first output sequence from a previous output of the second output sequence to yield a second symbol estimate.

13. The method of claim 12 further comprising:

correlating the first output with a product of the complex conjugate of the long spreading code and a first pilot walsh to yield a third output sequence;

correlating the second output with a product of the complex conjugate of the long spreading code and a second pilot walsh to yield a fourth output sequence;

summing the third output sequence and a complex conjugate of the fourth output sequence to yield a fifth output sequence; and subtracting 1 from the fifth output sequence to yield an error measure.

14. The method of claim 13 further comprising using the error measure to adapt an estimate of the upper and lower components of the receiver vector.

15. The method of claim 13 further comprising:

computing a magnitude square of the error measure;

low pass filtering the magnitude square of the error measure;

computing an inverse of the filtered magnitude square of the error measure; and providing the computed inverse to a soft decision decoder as a measure of reliability.

* * * * *